United States Patent
Malladi et al.

(10) Patent No.: US 11,727,935 B2
(45) Date of Patent: Aug. 15, 2023

(54) NATURAL LANGUAGE PROCESSING FOR OPTIMIZED EXTRACTIVE SUMMARIZATION

(71) Applicant: OPTUM TECHNOLOGY, INC., Eden Prairie, MN (US)

(72) Inventors: Vijay Varma Malladi, Hyderabad (IN); Suman Roy, Bangalore (IN); Gaurav Ranjan, Bangalore (IN); Gunjan Balde, Ujjain (IN)

(73) Assignee: Optum Technology, Inc., Eden Prairie, MN (US)

( * ) Notice: Subject to any disclaimer, the term of this patent is extended or adjusted under 35 U.S.C. 154(b) by 221 days.

(21) Appl. No.: 17/122,607

(22) Filed: Dec. 15, 2020

(65) Prior Publication Data
US 2022/0189484 A1 Jun. 16, 2022

(51) Int. Cl.
| | |
|---|---|
| *G10L 15/26* | (2006.01) |
| *G10L 15/01* | (2013.01) |
| *G06F 40/20* | (2020.01) |

(52) U.S. Cl.
CPC .............. *G10L 15/26* (2013.01); *G06F 40/20* (2020.01); *G10L 15/01* (2013.01)

(58) Field of Classification Search
CPC ......... G10L 15/26; G10L 15/01; G06F 40/20; G06F 40/258
See application file for complete search history.

(56) References Cited

U.S. PATENT DOCUMENTS

| | | |
|---|---|---|
| 6,996,414 B2 | 2/2006 | Vishwanathan et al. |
| 7,318,031 B2 | 1/2008 | Bantz et al. |
| 7,702,508 B2 | 4/2010 | Bennett |
| 7,849,147 B2 | 12/2010 | Rohall et al. |
| 7,865,560 B2 | 1/2011 | Rohall et al. |
| 7,886,012 B2 | 2/2011 | Bedi et al. |

(Continued)

OTHER PUBLICATIONS

Vanetik et al. Vanetik, N., Litvak, M., Churkin, E., & Last, M. (2020). An unsupervised constrained optimization approach to compressive summarization. Information Sciences, 509, 22-35. (Year: 2020).*

(Continued)

*Primary Examiner* — Bhavesh M Mehta
*Assistant Examiner* — Philip H Lam
(74) *Attorney, Agent, or Firm* — Alston & Bird LLP

(57) ABSTRACT

There is a need for more effective and efficient predictive natural language summarization. This need can be addressed by, for example, solutions for performing predictive natural language summarization using a constrained optimization model. In one example, a method includes identifying one or more per-party utterance subsets in a multi-party call transcript; generating a plurality of eligible extractive summaries that comply with one or more optimization constraints; for each eligible extractive summary of the plurality of eligible extractive summaries, determining an overall summary utility measure; generating the optimal extractive summary based at least in part on each overall summary utility measure for an eligible extractive summary of the plurality of eligible extractive summaries; and performing one or more summary-based actions based at least in part on the optimal extractive summary.

18 Claims, 8 Drawing Sheets

(56) References Cited

U.S. PATENT DOCUMENTS

| | | | |
|---|---|---|---|
| 8,750,489 | B2 | 6/2014 | Park |
| 8,825,478 | B2 | 9/2014 | Cox et al. |
| 8,914,452 | B2 | 12/2014 | Boston et al. |
| 8,983,840 | B2 | 3/2015 | Deshmukh et al. |
| 9,116,984 | B2 | 8/2015 | Caldwell et al. |
| 9,118,759 | B2 | 8/2015 | Krishnapuram et al. |
| 9,300,790 | B2 | 3/2016 | Gainsboro et al. |
| 9,348,817 | B2 | 5/2016 | Bohra et al. |
| 9,413,877 | B2 | 8/2016 | Aldrich et al. |
| 9,565,301 | B2 | 2/2017 | Lee et al. |
| 10,009,464 | B2 | 6/2018 | Slovacek |
| 10,051,122 | B2 | 8/2018 | Raanani et al. |
| 10,204,158 | B2 | 2/2019 | Hay et al. |
| 10,353,904 | B2 | 7/2019 | Enders et al. |
| 10,354,677 | B2 | 7/2019 | Mohamed et al. |
| 10,628,474 | B2 * | 4/2020 | Modani ............... G06F 40/30 |
| 10,637,898 | B2 | 4/2020 | Cohen et al. |
| 10,659,585 | B1 | 5/2020 | Graham et al. |
| 10,785,185 | B2 | 9/2020 | Vennam et al. |
| 11,018,885 | B2 | 5/2021 | Niekrasz |
| 11,070,673 | B1 | 7/2021 | Lemus et al. |
| 11,115,353 | B1 | 9/2021 | Crowley et al. |
| 11,228,681 | B1 | 1/2022 | Rosenberg |
| 11,232,266 | B1 | 1/2022 | Biswas et al. |
| 11,272,058 | B2 | 3/2022 | Khafizov et al. |
| 11,315,569 | B1 | 4/2022 | Talieh et al. |
| 11,487,797 | B2 | 11/2022 | Shukla et al. |
| 2010/0088299 | A1 | 4/2010 | O'Sullivan et al. |
| 2014/0200928 | A1 | 7/2014 | Watanabe et al. |
| 2015/0154956 | A1 | 6/2015 | Brown |
| 2016/0277577 | A1 | 9/2016 | Yentis et al. |
| 2017/0054837 | A1 | 2/2017 | Choi et al. |
| 2019/0042645 | A1 * | 2/2019 | Othmer ............... G06Q 10/107 |
| 2019/0297186 | A1 | 9/2019 | Karani |
| 2019/0373111 | A1 | 12/2019 | Rute et al. |
| 2020/0074512 | A1 | 3/2020 | Liang et al. |
| 2020/0137224 | A1 | 4/2020 | Rakshit et al. |
| 2020/0227026 | A1 | 7/2020 | Rajagopal et al. |
| 2020/0334419 | A1 | 10/2020 | Raanani et al. |
| 2021/0133251 | A1 | 5/2021 | Tiwari et al. |
| 2021/0182326 | A1 | 6/2021 | Romano et al. |
| 2021/0264897 | A1 | 8/2021 | Churav et al. |
| 2021/0272040 | A1 | 9/2021 | Johnson et al. |
| 2021/0304747 | A1 | 9/2021 | Haas et al. |
| 2021/0334469 | A1 * | 10/2021 | Feng ................ G06N 20/00 |
| 2021/0342554 | A1 | 11/2021 | Martin et al. |
| 2021/0375289 | A1 * | 12/2021 | Zhu ................ G10L 15/26 |
| 2022/0030110 | A1 * | 1/2022 | Khafizov ............. H04M 3/5175 |
| 2022/0067269 | A1 | 3/2022 | de Oliveira et al. |
| 2022/0068279 | A1 * | 3/2022 | Embar ................ G10L 15/32 |
| 2022/0108086 | A1 * | 4/2022 | Wu ................ G06F 40/35 |
| 2022/0109585 | A1 * | 4/2022 | Asthana ............. G06F 40/169 |
| 2022/0337443 | A1 | 10/2022 | Sood et al. |
| 2022/0414338 | A1 | 12/2022 | Cho et al. |

OTHER PUBLICATIONS

Banerjee et al. Banerjee, S., Mitra, P., & Sugiyama, K. (Jun. 2015). Multi-document abstractive summarization using ilp based multi-sentence compression. In Twenty-Fourth International Joint Conference on Artificial Intelligence. (Year: 2015).*

"Summarize Text With The Extractive Summarization API," Azure Cognitive Services|Microsoft Docs, Mar. 16, 2022, (6 pages) [Retrieved from the Internet May 4, 2022] <URL: https://docs.microsoft.com/en-us/azure/cognitive-services/language-service/text-summarization/how-to/call-api>.

Biswas, Pratik K. et al. "Extractive Summarization of Call Transcripts," arXiv Preprint arXiv:2103.10599, Mar. 19, 2021, (10 pages).

Brin, Sergey. "The PageRank Citation Ranking: Bringing Order To The Web," Proceedings of ASIS, vol. 98, Jan. 29, 1998, (17 pages).

Chandramouli, Aravind et al. "Unsupervised Paradigm For Information Extraction From Transcripts Using BERT," arXiv Preprint arXiv:2110.00949, Oct. 3, 2021, (11 pages).

Liang, Xinnian et al. "Unsupervised Keyphrase Extraction By Jointly Modeling Local and Global Context," arXiv Preprint arXiv:2109.07293v1 [cs.CL], Sep. 15, 2021, (10 pages).

Liu, Yang et al. "Text Summarization With Pretrained Encoders," arXiv Preprint arXiv:1908.08345v2 [cs.CL], Sep. 5, 2019, (11 pages).

Narayan, Shashi et al. "Stepwise Extractive Summarization and Planning With Structured Transformers," arXiv Preprint arXiv:2010.02744v1 [cs.CL], Oct. 6, 2020, (17 pages).

Padmakumar, Vishakh et al. "Unsupervised Extractive Summarization Using Pointwise Mutual Information," arXiv Preprint arXiv:2102.06272v2 [cs.CL], Mar. 22, 2021, (8 pages).

Sun, Xu et al. "Feature-Frequency-Adaptive On-Line Training For Fast and Accurate Natural Language Processing," Computational Linguistic, vol. 40, No. 3, Sep. 1, 2014, pp. 563-586.

Ushio, Asahi et al. "Back To The Basics: A Quantitative Analysis of Statistical and Graph-Based Term Weighting Schemes For Keyword Extraction," arXiv Preprint arXiv:210408028v2 [cs.LG], Sep. 13, 2021, (15 pages), United Kingdom.

Xu, Shusheng et al. "Unsupervised Extractive Summarization by Pre-Training Hierarchical Transformers," arXiv Preprint arXiv:2010.08242v1 [cs.CL], Oct. 16, 2020, (15 pages), Shanghai, China.

Zhang, Xingxing et al. "HIBERT: Document Level Pre-training of Hierarchical Bidirectional Transformers for Document Summarization," arXiv Preprint arXiv: 1905.06566v1 [cs.CL] May 16, 2019, (11 pages), available online at https://arxiv.org/pdf/1905.06566.pdf.

"Supercharge Your Call Notes—Automated Call Recording and Transcription," Jog.Ai, (6 pages), (online), [Retrieved from the Internet Nov. 15, 2021] <URL: https://jog.ai/>.

"Trustworthy and Cutting Edge AI," The Blue, (12 pages), (online), [Retrieved from the Internet Nov. 12, 2021] <URL: https://theblue.ai/en/>.

Banerjee, Siddhartha et al. "Multi-Document Abstractive Summarization Using ILP Based Multi-Sentence Compression," Proceedings of the Twenty-Fourth International Joint Conference On Artificial Intelligence (IJCAI 2015), pp. 1208-1214, Jun. 23, 2015.

Baumel, Tal et al. "Query Focused Abstractive Summarization: Incorporating Query Relevance, Multi-Document Coverage, and Summary Length Constraints Into seq2seq Models," arXiv Preprint, arXiv: 1801.07704v2, Jan. 25, 2018, (9 pages).

Baumel, Tal et al. "Topic Concentration in Query-Focused Summarization," Proceedings of the Thirtieth AAAI Conference On Artificial Intelligence (AAAI-16), pp. 2573-2579, Mar. 5, 2016.

Canhasi, Ercan. "Ercan Canhasi: Query Focused Multi Document Summarization Based on the Multi Facility Location Problem," Computer Science On-Line Conference, Artificial Intelligence Trends In Intelligent Systems, CSOC 2017, Advances In Intelligent Systems and Computing, vol. 573, Springer, Cham., Apr. 7, 2017, pp. 210-219, DOI: 10.1007/978-3-319-57261-1_21.

Carbonell, Jaime et al. "The Use of MMR, Diversity-Based Reranking for Reordering Documents and Producing Summaries," In Proceedings of the 21st Annual International ACM SIGIR Conference on Research and Development In Information Retrieval, pp. 335-336, Aug. 1, 1998.

Devlin, Jacob et al. "BERT: Pre-Training of Deep Bidirectional Transformers for Language Understanding," Proceedings of NAACL-HLT 2019, Jun. 2, 2019, pp. 4171-4186.

Feigenblat, Guy et al. "Unsupervised Query-Focused Multi-Document Summarization Using The Cross Entropy Method," SIGIR '17: Proceedings of the 40th International ACM SIGIR Conference On Research and Development In Information Retrieval, Aug. 7, 2017, pp. 961-964, DOI: 10.1145/3077136.3080690.

Garg, Nikhil et al. "Clusterrank: A Graph Based Method For Meeting Summarization," Proceedings of the 10th International Conference of the International Speech Communication Association (Interspeech 2009), pp. 1499-1502, Sep. 6, 2009, Brighton, United Kingdom.

Goldstein, Jade et al. "Summarization: (1) Using MMR for Diversity-Based Reranking and (2) Evaluating Summaries," Carnegie-Mellon University, Language Technologies Institute, Tipster III Summarization Project, Oct. 1, 1998, pp. 181-195.

(56) References Cited

OTHER PUBLICATIONS

Gupta, Surabhi et al. "Measuring Importance and Query Relevance In Topic-Focused Multi-Document Summarization," 45th Annual Meeting of the Association for Computational Linguistics Demo and Poster Sessions, Jun. 2007, pp. 193-196.
Hearst, Marti A. "Text-Tiling: A Quantitative Approach To Discourse Segmentation," Association for Computational Linguistics 1993 (1993), pp. 1-10.
Kothadiya, Aditya. "Why We Built A Note Taking Software—A Tool That Automatically Takes Notes And Analyzes Sales and Customer Calls," Avoma Blog, (article, online), [Retrieved from the Internet Nov. 15, 2021] <https://www.avoma.com/blog/ai-note-taking-software>.
Mihalcea, Rada et al. "TextRank: Bringing Order Into Texts," Proceedings of the 2004 Conference on Empirical Methods in Natural Language Processing, Association for Computational Linguistics, Jul. 2004, pp. 404-411, Barcelona, Spain.
Radev, Dragomir R. et al. "Ranking Suspected Answers To Natural Language Questions Using Predictive Annotation," ANLC '00: Proceedings of the Sixth Conference On Applied Natural Language Processing, Apr. 29, 2000, pp. 150-157, https://doi.org/10.3115/974147.974168.
Rahman, Nazreena et al. "A Method for Semantic Relatedness Based Query Focused Text Summarization," In International Conference on Pattern Recognition and Machine Intelligence (PReMI 2017), LNCS 10597, Springer, Cham., pp. 387-393, Dec. 5, 2017, doi: 10.1007/978-3-319-69900-4_49.
Singer, Eleanor et al. "Some Methodological Uses of Responses To Open Questions and Other Verbatim Comments In Quantitative Surveys," Methods, Data, Analyses: A Journal For Quantitative Methods and Survey Methodology (mda), vol. 11, No. 2, (2017), pp. 115-134, DOI: 10.12758/mda.2017.01.
Steinberger, Josef et al. "Evaluation Measures for Text Summarization," Computing and Informatics, vol. 28, Mar. 2, 2009, pp. 1001-1026.
Vanetik, Natalia et al. "Query-Based Summarization Using MDL Principle," Proceedings of the MultiLing 2017 Workshop On Summarization and Summary Evaluation Across Source Types and Genres, Association for Computational Linguistics, pp. 22-31, Apr. 3, 2017, Valencia, Spain.
Vreeken, Jilles et al. "KRIMP: Mining Itemsets That Compress," Data Mining and Knowledge Discovery, Jul. 2011, vol. 23, No. 1, pp. 169-214, DOI: 10.1007/s10618-010-0202-x.
Yang, Zichao et al. "Hierarchical Attention Networks for Document Classification," Proceedings of the NAACL-HLT 2016, Association for Computational Linguistics, Jun. 12, 2016, pp. 1480-1489, San Diego, California.
Yuliska et al. "A Comparative Study of Deep Learning Approaches for Query-Focused Extractive Multi-Document Summarization," 2019 IEEE 2nd International Conference on Information and Computer Technologies (ICICT), May 13, 2019, pp. 153-157, doi: 10.1109/INFOCT.2019.8710851.
Zhou, Peng et al. "Attention-Based Bidirectional Long Short-Term Memory Networks for Relation Classification," Proceedings of the 54th Annual Meeting of the Association for Computational Linguistics, pp. 207-212, Aug. 7, 2016, Berlin, Germany.
Zweig, Geoffrey et al. "Automated Quality Monitoring For Call Centers Using Speech and NLP Technologies," Proceedings of the Human Language Technology Conference of the NAACL, Companion Volume, pp. 292-295, Jun. 2006.
Banerjee, Siddhartha et al. "Multi-Document Abstractive Summarization Using ILP Based Multi-Sentence Compression," In Proceedings of the Twenty-Fourth International Joint Conference On Artificial Intelligence (IJCAI 2015), Jan. 2015, pp. 1208-1214.
Carbonell, Jaime et al. "The Use Of MMR, Diversity-Based Reranking For Reordering Documents and Producing Summaries," In Proceedings of the 21st Annual International ACM SIGIR Conference on Research and Development In Information Retrieval, Aug. 1998, pp. 335-336. DOI: 10.1145/290941.291025.
Chen, Yun-Nung et al. "Intra-Speaker Topic Modeling For Improved Multi-Party Meeting Summarization With Integrated Random Walk," In Proceedings of the 2012 Conference of the North American Chapter of the Association for Computational Linguistics: Human Language Technologies, Jun. 2012, pp. 377-381.
Dang, Hoa Trang. "Overview of DUC 2005," In Proceedings of the Document Understanding Conference, Oct. 9, 2005, vol. 2005, (12 pages). [Available online: https://www-nlpir.nist.gov/projects/duc/pubs/2005papers/OVERVIEW05.pdf].
Filatova, Elena et al. "Event-Based Extractive Summarization," In Proceedings of ACL Workshop on Summarization, vol. 111, (2004), (8 pages).
Garg, Nikhil et al. "ClusterRank: A Graph Based Method For Meeting Summarization," IDIAP Research Institute, Jun. 2009, (5 pages), Martigny, Switzerland.
Gillick, Dan et al. "A Scalable Global Model For Summarization," In Proceedings of the NAACL HLT Workshop On Integer Linear Programming For Natural Language Processing, Jun. 2009, pp. 10-18.
Higashinaka, Ryuichiro et al. "Improving HMM-Based Extractive Summarization For Multi-Domain Contact Center Dialogues," In 2010 IEEE Spoken Language Technology Workshop, Dec. 12, 2010, pp. 61-66. DOI: 10.1109/SLT.2010.5700823.
Li, Chen et al. "Using Supervised Bigram-Based ILP for Extractive Summarization," In Proceedings of the 51st Annual Meeting of the Association For Computational Linguistics, Aug. 4, 2013, pp. 1004-1013, Sofia, Bulgaria.
McDonald, Ryan. "A Study Of Global Inference Algorithms In Multi-Document Summarization," In European Conference on Information Retrieval, Apr. 2, 2007, (12 pages), Springer, Berlin, Heidelberg. [Available online: https://storage.googleapis.com/pub-tools-public-publication-data/pdf/32687.pdf].
Mehdad, Yashar et al. "Abstractive Meeting Summarization with Entailment and Fusion," In Proceedings of the 14th European Workshop on Natural Language Generation, Aug. 2013, pp. 136-146. [Available online: https://www.aclweb.org/anthology/W13-2117.pdf].
Mihalcea, Rada et al. "Textrank: Bringing Order Into Texts," In Proceedings of the 2004 Conference On Empirical Methods In Natural Language Processing, Jul. 2004, pp. 404-411. [Available online: https://www.aclweb.org/anthology/W04-3252.pdf].
Murray, Gabriel et al. "Generating and Validating Abstracts Of Meeting Conversations: A User Study," In Proceedings of the 6th International Natural Language Generation Conference (2010), (9 pages). [Available online: https://www.aclweb.org/anthology/W10-4211.pdf].
Nenkova, Ani et al. "The Impact Of Frequency On Summarization," Technical Report MSRTR-2005-101, Microsoft Research, Jan. 2005, (9 pages), Redmond, Washington. [Available online: http://citeseerx.ist.psu.edu/viewdoc/download?doi=10.1.1.529.6099&rep=rep1&type=pdf].
Oya, Tatsuro et al. "A Template-Based Abstractive Meeting Summarization: Leveraging Summary and Source Text Relationships," In Proceedings of the 8th International Natural Language Generation Conference (INLG), Jun. 2014, pp. 45-53. [Available online: https://www.aclweb.org/anthology/W14-4407.pdf].
Rudra, Koustav et al. "Summarizing Situational Tweets in Crisis Scenarios: An Extractive-Abstractive Approach," IEEE Transactions On Computational Social Systems, Sep. 16, 2019, vol. 6, No. 5, pp. 981-993.
Rudra, Koustav. "Extracting and Summarizing Information From Microblogs During Disasters," Ph.D. Thesis, Apr. 2018, (199 pages).
Shang, Guokan et al. "Unsupervised Abstractive Meeting Summarization with Multi-Sentence Compression and Budgeted Submodular Maximization," In Proceedings of the 56th Annual Meeting Of The Association For Computational Linguistics (Long Papers), Jul. 15, 2018, pp. 664-674, Melbourne, Australia. [Available online: https://www.aclweb.org/anthology/P18-1062.pdf].
Steinberger, Josef et al. "Evaluation Measures for Text Summarization," Computing and Informatics, vol. 28, No. 2, (2009), pp. 1001-1026. [Available online: http://www.cai.sk/ojs/index.php/cai/article/viewFile/37/24].

(56) References Cited

OTHER PUBLICATIONS

Yih, Wen-tau et al. "Multi-Document Summarization By Maximizing Informative Content-Words," In IJCAI, Jan. 6, 2007, vol. 7, pp. 1776-1782. [Available online: https://www.aaai.org/Papers/IJCAI/2007/IJCAI07-287.pdf].

Stepanov, E. et al. "Automatic Summarization of Call-Center Conversations," In Conference: IEEE Automatic Speech Recognition and Understanding Workshop (ASRU 2015), (2 pages), Dec. 2015, available online: http://sisl.disi.unitn.it/wp-content/uploads/2015/11/ASRU15-SpeechSummarizationDemo.pdf.

Trione, Jeremy et al. "Beyond Utterance Extraction: Summary Recombination for Speech Summarization," In Interspeech, pp. 680-684, Sep. 2016, available online: https://pageperso.lis-lab.fr/benoit.favre/papers/favre_is2016a.pdf.

Zhong, Junmei et al. "Predicting Customer Call Intent By Analyzing Phone Call Transcripts Based On CNN For Multi-Class Classification," Computer Science & Information Technology (CS & IT), pp. 9-20, arXiv preprint arXiv:1907.03715, Jul. 8, 2019, (12 pages), available online: https://arxiv.org/ftp/arxiv/papers/1907/1907.03715.pdf.

Ma, Bing et al. "Extractive Dialogue Summarization Without Annotation Based On Distantly Supervised Machine Reading Comprehension In Customer Service," In IEEE/ACM Transactions on Audio, Speech, and Language Processing, vol. 30, pp. 87-Jan. 1, 97, 2022, (Year: 2022).

Notice of Allowance and Fee(s) Due, for U.S. Appl. No. 17/815,817, dated Mar. 30, 2023, (12 pages), United States Patent and Trademark Office, US.

\* cited by examiner 0, this is Reynell speaking
0, do I have the pleasure of speaking with Ms. Rebecca
1, hi Reynell good afternoon ahhh yes you do
0, how is it going today ma'am
1, good I apologize for talking softly I have a baby sleeping on top of me so hopefully you can hear me okay
0, not a problem
1, let me know if you can't hear \laughter
1, I'm I'm calling I had given birth in late October to my son and he was born six weeks early so he was inside the neonatal intensive care unit and I have just received a letter from the hospital that my son was born at saying that I needed to contact my insurance to update the coordination of benefits
1, as my as my claim is put into pended status as they are investigating the existence of other insurance coverage
0, I see that
1, so if I and so I don't know if there is anything that I need to do on my end
0, sure
1, please do notify me I may be charged for two hundred and forty thousand dollars \laughter and I am like
0, don't worry I will just I'll recheck
0, we can take care of this with one quick easy question
1, so
0, does do you have any other insurance primary to United Healthcare        1, no no just United Healthcare
0, and that takes care of it I've automatically updated that information and all claims pending for C. O. B. ehhh go back for reprocessing now okay
1, okay perfect see and then ummm I guess yeah I guess I guess that's it thank you so much Reynell I appreciate it
0, no problem and congratulations to and you family ma'am okay

FIG. 5

Summary:

801 1. I am calling I had given birth in late October to my son and he was born six weeks early so he was inside the neonatal intensive care unit and I have just received a letter from the hospital that my son was born at saying that I needed to contact my insurance to update the coordination of benefits

802 0. and that takes care of it I have automatically updated that information and all claims pending for COB go back for reprocessing now Top Content words: care, bear, son, update, insurance, letter, hospital, unit, receive, intensive, claim, neonatal 803

Constructed phrases: 804

1. Neonatal intensive care unit
2. Insurance letter
3. Hospital care
4. Son
5. Bear
6. Update

FIG. 8

NATURAL LANGUAGE PROCESSING FOR OPTIMIZED EXTRACTIVE SUMMARIZATION

BACKGROUND

Various embodiments of the present invention address technical challenges related to performing extractive summarization, such as extractive summarization of multi-party interaction transcripts. Various embodiments of the present invention address the shortcomings of natural language summarization systems and disclose various techniques for efficiently and reliably performing extractive summarization, such as extractive summarization of multi-party interaction transcripts.

BRIEF SUMMARY

In general, embodiments of the present invention provide methods, apparatus, systems, computing devices, computing entities, and/or the like for performing extractive summarization, such as extractive summarization of multi-party interaction transcripts. Certain embodiments of the present invention utilize systems, methods, and computer program products that perform extractive summarization of multi-party interaction transcripts by using per-party utterance subsets, integer linear programming (ILP) operations configured to perform constrained optimization of an overall summary utility measure across eligible extractive summaries, and using information quality measures and/or linguistic quality measures of interaction utterances to determine utility measures for extractive summaries.

In accordance with one aspect, a method is provided. In one embodiment, the method comprises: identifying one or more per-party utterance subsets in the multi-party call transcript, wherein each per-party utterance subset of the one or more per-party utterances comprises a related subset of the plurality of interaction utterances that is associated with an interaction party of a plurality of interaction parties; generating a plurality of eligible extractive summaries, wherein: (i) each eligible extractive summary of the plurality of eligible comprises a covered subset of the plurality of interaction utterances that complies with one or more optimization constraints, and (ii) the one or more optimization constraints comprises a similarity-based optimization constraint requiring that, if the covered subset for a particular eligible extractive summary of the plurality of extractive summaries comprises a particular interaction utterance of the plurality of interaction utterances that is in a particular per-party utterance subset of the one or more per-party utterances subsets, then the covered subset for the particular eligible extractive summary should further comprise each other interaction utterance of the plurality of interaction utterances that is in any per-party utterance subset of the one or more per-party utterances subsets other than the particular per-party utterance subset and that has a threshold-satisfying utterance similarity measure with respect to the particular interaction utterance; for each eligible extractive summary of the plurality of eligible extractive summaries, determining an overall summary utility measure; generating the optimal extractive summary based at least in part on each overall summary utility measure for an eligible extractive summary of the plurality of eligible extractive summaries; and performing one or more summary-based actions based at least in part on the optimal extractive summary.

In accordance with another aspect, a computer program product is provided. The computer program product may comprise at least one computer-readable storage medium having computer-readable program code portions stored therein, the computer-readable program code portions comprising executable portions configured to: identify one or more per-party utterance subsets in the multi-party call transcript, wherein each per-party utterance subset of the one or more per-party utterances comprises a related subset of the plurality of interaction utterances that is associated with an interaction party of a plurality of interaction parties; generate a plurality of eligible extractive summaries, wherein: (i) each eligible extractive summary of the plurality of eligible comprises a covered subset of the plurality of interaction utterances that complies with one or more optimization constraints, and (ii) the one or more optimization constraints comprises a similarity-based optimization constraint requiring that, if the covered subset for a particular eligible extractive summary of the plurality of extractive summaries comprises a particular interaction utterance of the plurality of interaction utterances that is in a particular per-party utterance subset of the one or more per-party utterances subsets, then the covered subset for the particular eligible extractive summary should further comprise each other interaction utterance of the plurality of interaction utterances that is in any per-party utterance subset of the one or more per-party utterances subsets other than the particular per-party utterance subset and that has a threshold-satisfying utterance similarity measure with respect to the particular interaction utterance; for each eligible extractive summary of the plurality of eligible extractive summaries, determine an overall summary utility measure; generating the optimal extractive summary based at least in part on each overall summary utility measure for an eligible extractive summary of the plurality of eligible extractive summaries; and perform one or more summary-based actions based at least in part on the optimal extractive summary.

In accordance with yet another aspect, an apparatus comprising at least one processor and at least one memory including computer program code is provided. In one embodiment, the at least one memory and the computer program code may be configured to, with the processor, cause the apparatus to: identify one or more per-party utterance subsets in the multi-party call transcript, wherein each per-party utterance subset of the one or more per-party utterances comprises a related subset of the plurality of interaction utterances that is associated with an interaction party of a plurality of interaction parties; generate a plurality of eligible extractive summaries, wherein: (i) each eligible extractive summary of the plurality of eligible comprises a covered subset of the plurality of interaction utterances that complies with one or more optimization constraints, and (ii) the one or more optimization constraints comprises a similarity-based optimization constraint requiring that, if the covered subset for a particular eligible extractive summary of the plurality of extractive summaries comprises a particular interaction utterance of the plurality of interaction utterances that is in a particular per-party utterance subset of the one or more per-party utterances subsets, then the covered subset for the particular eligible extractive summary should further comprise each other interaction utterance of the plurality of interaction utterances that is in any per-party utterance subset of the one or more per-party utterances subsets other than the particular per-party utterance subset and that has a threshold-satisfying utterance similarity measure with respect to the particular interaction utterance; for each eligible extractive summary of the plurality of eligible extractive summaries, determine an overall summary utility measure; generating the optimal extractive summary based at least in part on each overall summary utility measure for an eligible extractive summary of the plurality of eligible extractive summaries; and perform one or more summary-based actions based at least in part on the optimal extractive summary.

BRIEF DESCRIPTION OF THE DRAWINGS

Figure 1:
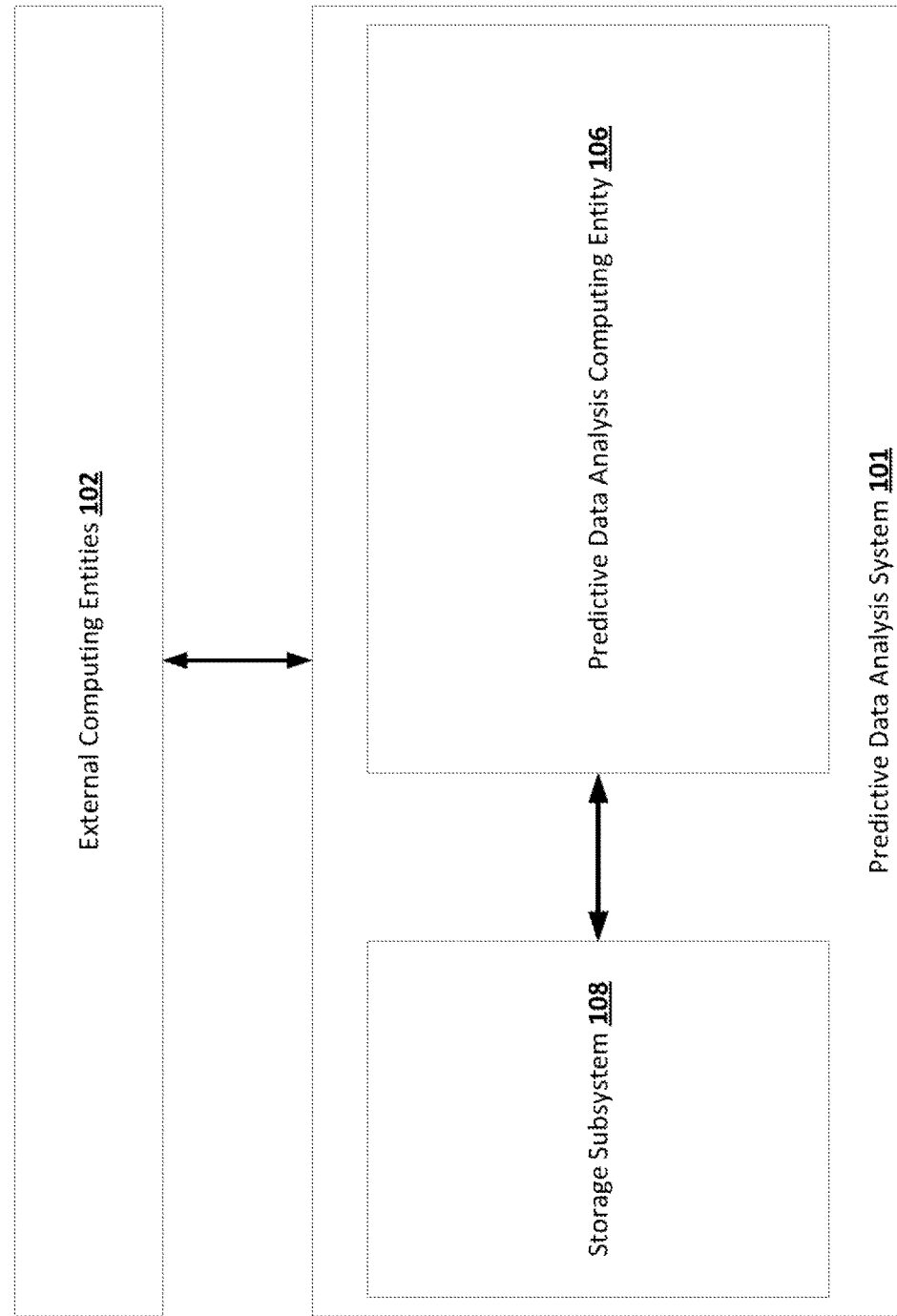

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
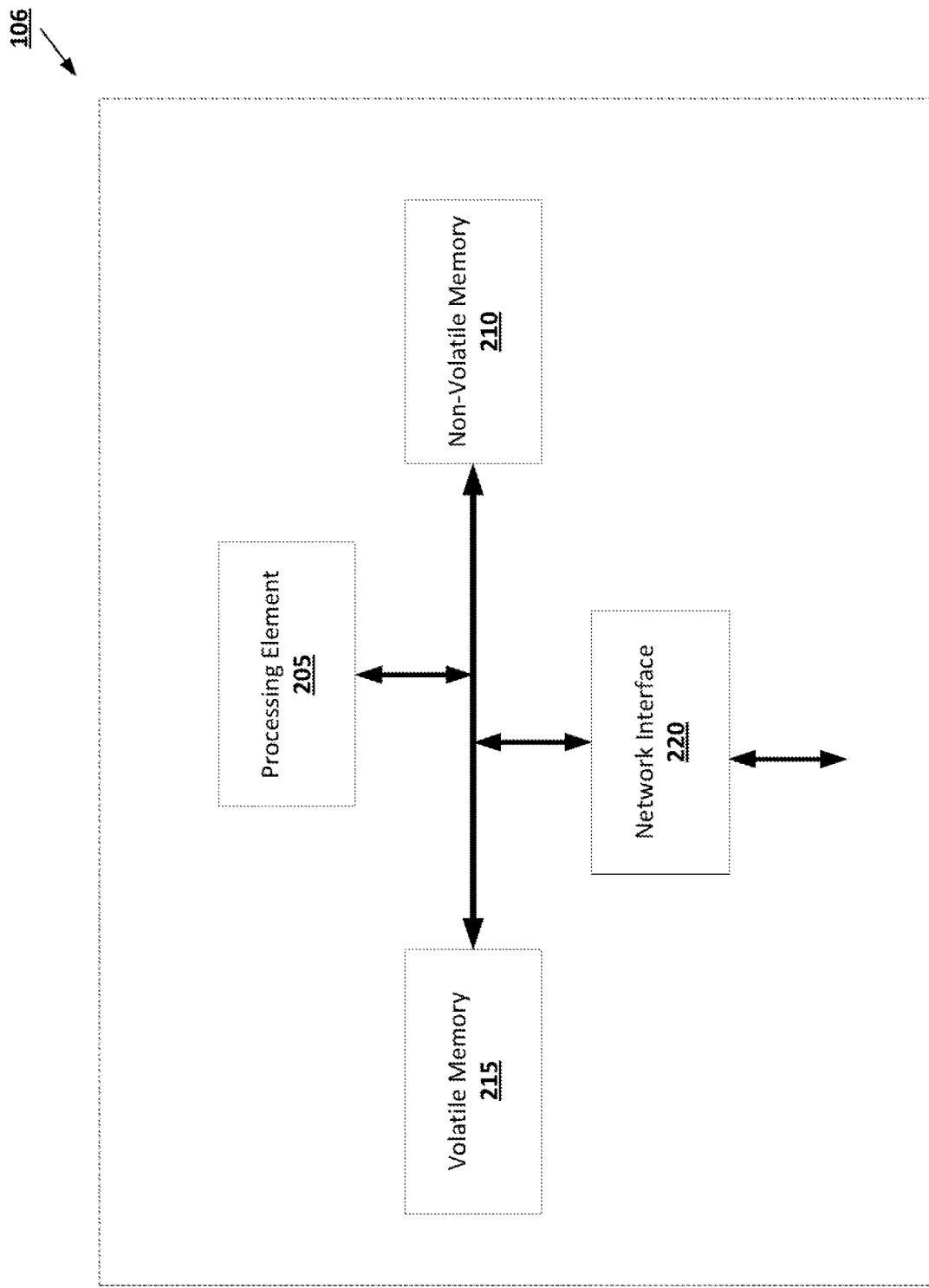

FIG. 2 provides an example predictive data analysis computing entity in accordance with some embodiments discussed herein.

Figure 3:
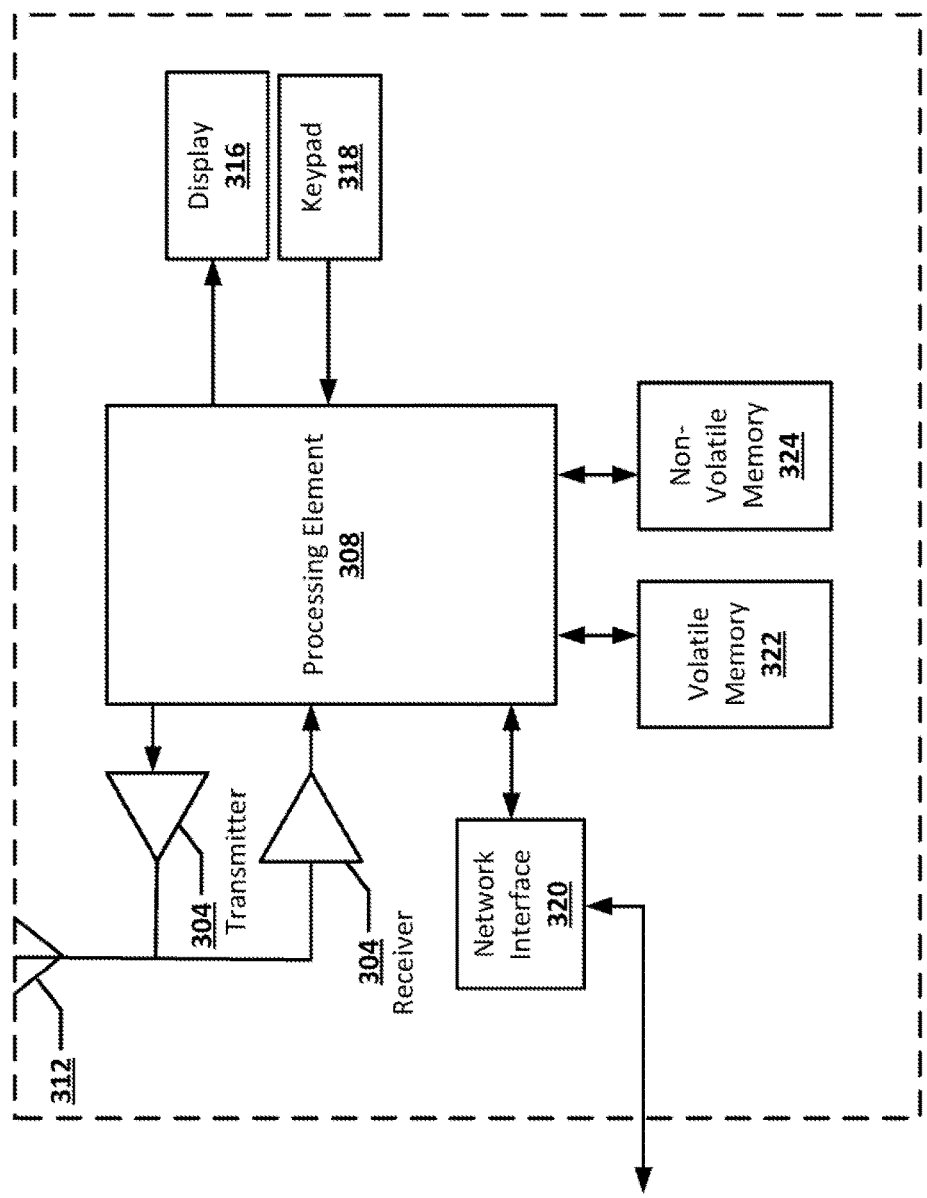

FIG. 3 provides an example external computing entity in accordance with some embodiments discussed herein.

Figure 4:
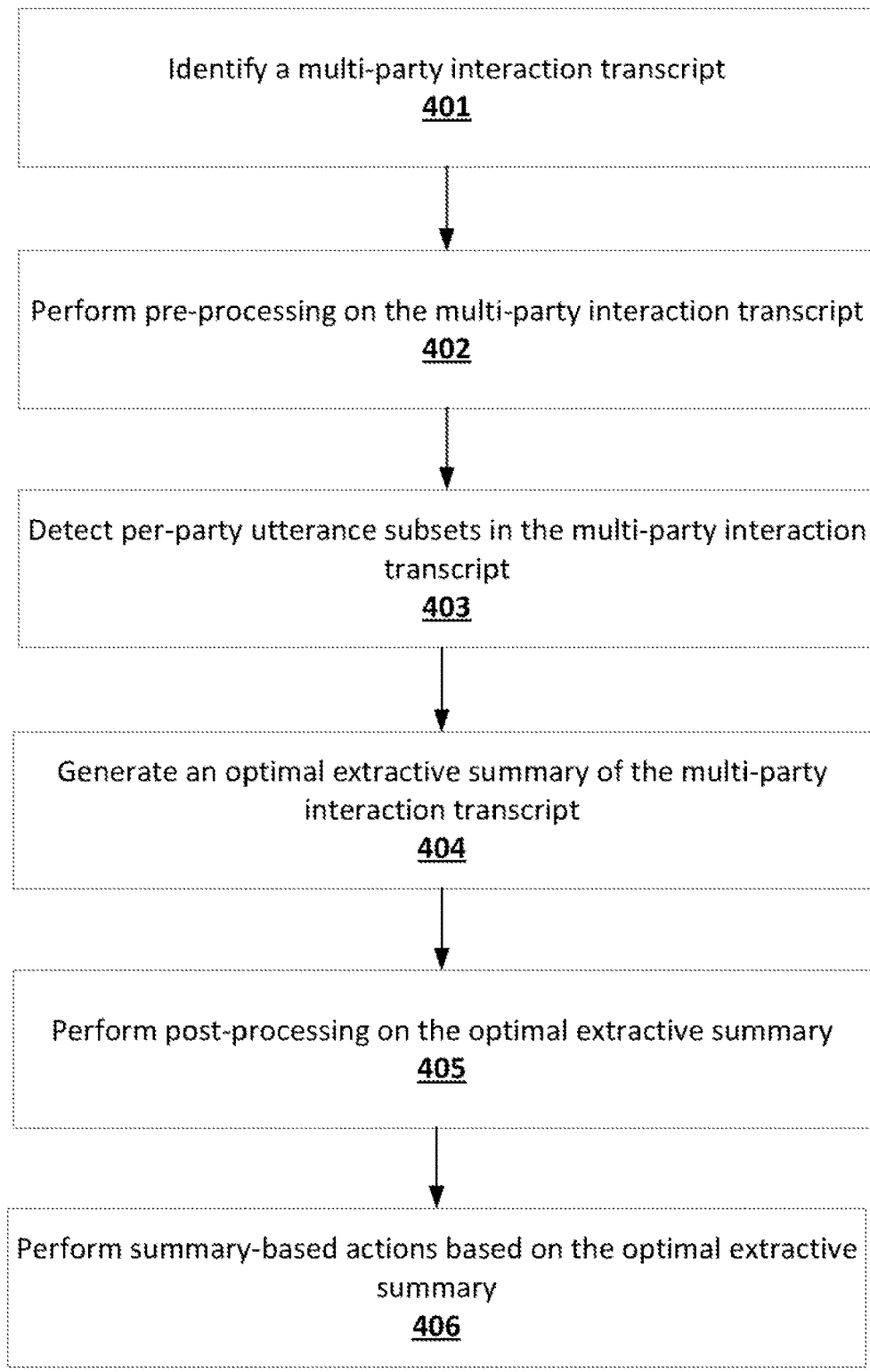

FIG. 4 is a flowchart diagram of an example process for generating an optimal extractive summary of a multi-party interaction transcript in accordance with some embodiments discussed herein.

FIG. 5 provides an operational example of a multi-party interaction transcript in accordance with some embodiments discussed herein.

Figure 6:
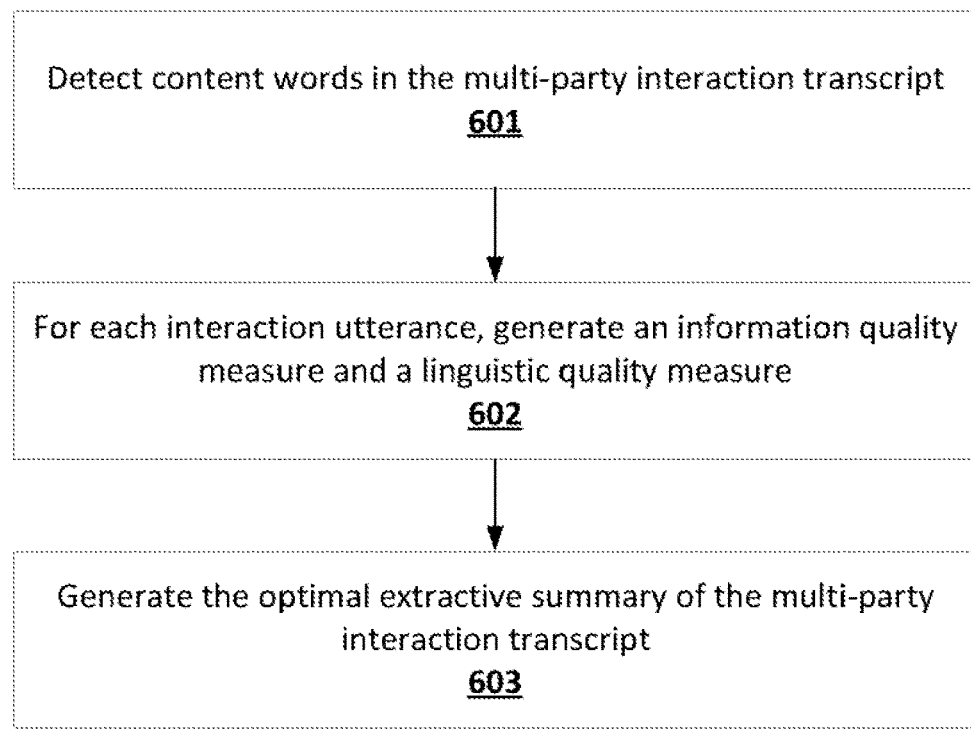

FIG. 6 is a flowchart diagram of an example process for generating an optimal extractive summary of a multi-party interaction transcript in accordance with detected per-party utterances in accordance with some embodiments discussed herein.

Figure 7:
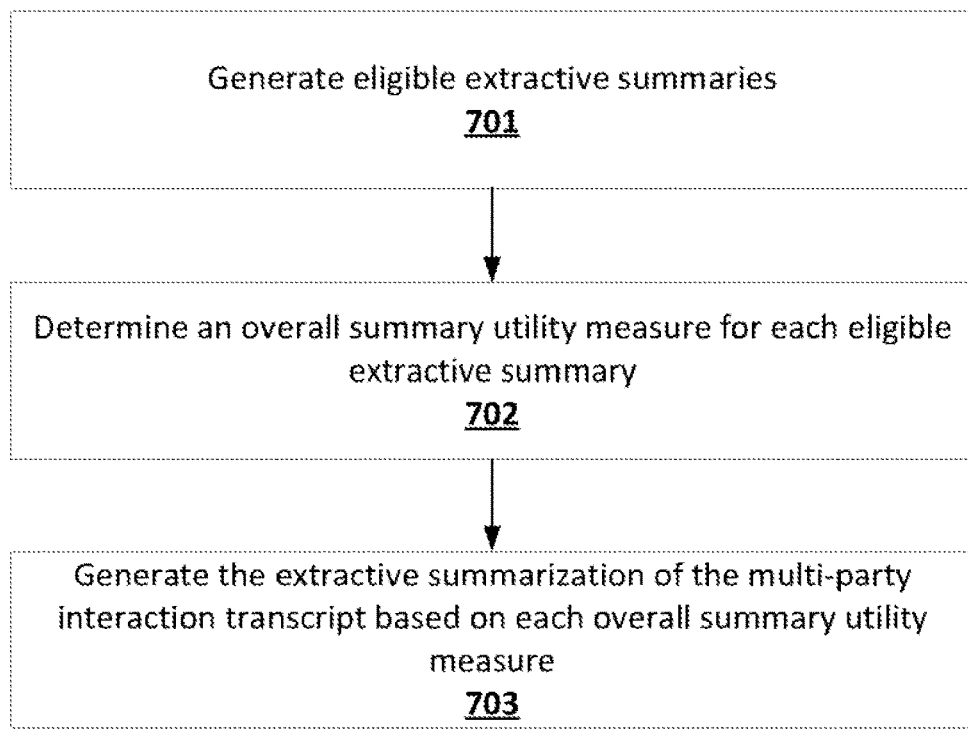

FIG. 7 is a flowchart diagram of an example process for performing interlinear programming (ILP) to generate an optimal extractive summary of a multi-party interaction transcript in accordance with some embodiments discussed herein.

FIG. 8 provides an operational example of a summary output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Aspects of the present invention present an automatic extractive summarization method of multi-party (e.g., two-party) transcript data along with extraction of content information that utilizes unsupervised machine learning techniques. A proposed method uses an ILP formulation to select sentences from utterances of each party in a transcript to form an extractive summary. The proposed method also leverages the similarity in dialogues between two or more parties to select the sentences in the summary. Content words may also be detected by formulating a cost function as a part of a cost function that is included in the ILP task formulation. Manual and automatic evaluation results demonstrate the success of the proposed method in achieving high scores in terms of both readability and informativeness of extracted summaries. Some aspects of the present invention rely on extracting relevant information in the form of a summary and getting content words from a transcript to understand and improve customer experience, boost sales, reduce customer churn, and streamline the efficiency of customer service processes.

According to some aspects of the present invention, a proposed method weighs each utterance in a transcript by measuring the utterance's information quality and linguistic quality, and generates an extractive summarization for each party, where each party's utterances involved in a transcript, may in some embodiments be treated as a separate cluster. According to some embodiments, it is assumed that most of the information during a conversation is centered around a limited set of special content words and a dialogue exchanged between parties are more or less similar in context. Aspects of the proposed solution focus on the coverage of important content words across party utterances and computation of similarity among the utterances involved in the call transcript. The machine learning models utilized by aspects of the present invention to perform extractive summarization are fully unsupervised and do not rely on any annotations. The needed input for such models may simply consist of a list of utterances for two or more parties without any metadata. In doing so, the noted aspects of the present invention present extractive summarization solutions that are both reliable, computationally efficient, and can be trained without using annotated training data.

Exemplary inventive and technologically advantageous aspects of the present invention include the following aspects: (i) using an ILP-based summarization solution that treats utterances by different parties separately and is thus able to infer predictive insights based at least in part on cross-party interactions and cross-party relationships between utterances, (ii) selecting utterances to include in the summary by maximizing weight of content words as well as informativeness and linguistic quality of utterances, which in turn improves the accuracy and reliability of the generated summary, and (iii) utilizing an unsupervised approach that partitions the utterances in per-party utterance subsets and extracting summaries using informativeness and linguistic quality of the noted per-party utterance subsets.

II. Definitions

The term "multi-party interaction transcript" may refer to a data entity that is configured to describe a temporal flow of verbal interactions between two or more interaction parties. An example of a multi-party interaction transcript is a call transcript between two or more parties to the call, such as a call transcript for a call between a customer service agent and a customer. In the noted example, the call transcript may describe verbal interactions by the parties in a temporally sequential manner, where each verbal interaction by a party may include one or more utterances (e.g., on or more sentences). For example, with respect to the call transcript for a call between a customer service agent and a customer, the call transcript may describe that a first set of utterances by the customer service agent (e.g., "Hello, how is your day today and how can I help you?") is temporally followed by a second set of utterances by the customer (e.g., "Thank you, doing well, I am trying to check my account balance."), which may then be temporally followed by a third set of utterances by the customer service agent, and so on. Other examples of multi-party interaction transcripts include meeting transcripts, conference call transcripts, auction transcripts, and/or the like.

The term "interaction utterance" may refer to a data entity that is configured to describe a semantically coherent unit of words that is recorded by the multi-party interaction transcript. An example of an interaction utterance is a sentence. In some embodiments, to detect interaction utterances in a multi-party interaction transcript, a predictive data analysis computing entity utilizes one or more speech fragmentation algorithms, such as one or more sentence detection algorithms. Each interaction utterance in a multi-party interaction transcript is typically associated with an interaction party of the plurality of interaction parties that are in turn associated with the multi-party interaction transcript. Accordingly, in some embodiments, the interaction utterances in a multi-party interaction transcript may be divided into two or more subsets, where each subset includes the set of interaction utterances in a multi-party interaction transcript that is associated with a particular interaction party of the two or more interaction parties. The described subsets are referred to herein as per-party utterance subsets.

The term "per-party utterance subset" may refer to a data entity that is configured to describe a subset of interaction utterances in a multi-party interaction transcript that includes all of the interaction utterances that are associated with a particular interaction party of the two or more interaction parties that are associated with the particular multi-party interaction transcript. Accordingly, in some embodiments, the interaction utterances in a multi-party interaction transcript may be divided into two or more subsets, where each subset includes the set of interaction utterances in a multi-party interaction transcript that is associated with a particular interaction party of the two or more interaction parties. For example, with respect to the call transcript for a call between a customer service agent and a customer, the call transcript may be associated with two per-party utterance subsets: a first per-party utterance subsets that describes all of the interaction utterances associated with the customer service agent and a second per-party utterance subset that describes all of the interaction utterances associated with the customer.

The term "optimal extractive summary" may refer to a data entity that is configured to describe one or more segments of a multi-party interaction transcript that are deemed to optimally represent the contents of the multi-party interaction transcript. For example, the optimal extractive summary for a multi-party interaction transcript may include a covered subset of the interaction utterances associated with the multi-party interaction transcript that are deemed to optimally represent the contents of the multi-party interaction transcript. As another example, the optimal extractive summary for a multi-party interaction transcript may include one or more content words associated with the multi-party interaction transcript that are deemed to optimally represent the contents of the multi-party interaction transcript. As yet another example, the optimal extractive summary for a multi-party interaction transcript may include one or more word collections (e.g., one or more word collections) associated with the multi-party interaction transcript that are deemed to optimally represent the contents of the multi-party interaction transcript.

The term "content word" may refer to a data entity that is configured to describe a word that is deemed to likely have a substantial amount of information about the contents of at least one portion of a multi-party interaction transcript that includes the content word. Content words of a multi-party interaction transcript may be determined by using one or more semantically significant word detection techniques. For example, in accordance with one technique, words having particular grammatical/semantic roles (e.g., as inferred by PoS) may be deemed to be content words. Accordingly, in some embodiments, at least one of nouns, verbs, and adjectives (e.g., all three of nouns, verbs, and adjectives) may be deemed to be content words. As another example, in accordance with another technique, words that match entries in a dictionary of semantically significant words may be deemed to be content words. In some embodiments, a predictive data analysis computing entity assigns a weight to each content word using a word ranking algorithm, such as a core rank algorithm.

The term "information quality measure" may refer to a data entity that is configured to describe an estimated measure of the degree of information contained in the words of a corresponding interaction utterance. For example, the information quality measure for a particular sentence may describe the likelihood that the sentence contains significant information based at least in part on the words used in the sentence. In some embodiments, the information quality measure for an interaction utterance is determined by combining (e.g., aggregating) each per-word information quality measure for a word used in the interaction utterance. In some embodiments, the per-word information quality measure for a word in an interaction utterance is determined based at least in part on the Equation 1:

$$S(V_i) = (1-d) + d \times \sum_{V_j \in adj(V_i)} \frac{w_{ij}}{\sum_{V_k \in adj(V_i)} w_{jk}} S(V_j) \quad \text{(Equation 1)}$$

In Equation 1, $V_i$ represents the word, $S(V_i)$ represents the per-word information quality measure for the word, $adj(V_i)$ represents the neighboring words of $V_i$ as determined based at least in part on a graph representation of the semantic relationship of the words of the interaction utterance, and dis a damping factor (e.g., 0.85).

The term "linguistic quality measure" may refer to a data entity that is configured to describe an estimated measure of the likelihood that an utterance represents a linguistically viable collection of words. In some embodiments, the linguistic quality measure is determined based at least in part on a language model, such as a trigram language model that assigns probabilities to sequences of words. For example, given an interaction utterance $p_i^{c^j}$ that includes a sequence of words $\{w_1, w_2, \ldots, w_q\}$, the linguistic quality score for the interaction utterance (denoted as $LQ(p_i^{c^j})$) may be determined using the equation $$LQ(p_i^{c^j}) = \frac{1}{1 - LL(w_1, w_2, \ldots, w_q)},$$

where $LL(w_1, w_2, \ldots, w_q)$ is a probability aggregation measure for the interaction utterance $p_i^{c^j}$ that can be computed using the equation $$LL(w_1, w_2, \ldots, w_q) = \frac{1}{L} \log_2 \prod_{t=2}^{q} (w_t \mid w_{t-1}, w_{t-2}).$$

The term "utterance coverage constraint" may refer to a data entity that is configured to describe an optimization constraint for determining an eligible extractive summarization of a multi-party interaction transcript, where the optimization constraint may be configured to require that, if the covered subset for a particular eligible extractive summary comprises a particular covered content word, then the covered subset for the particular eligible extractive summary should further comprise at least one interaction utterance of the plurality of interaction utterances that is associated with the particular covered content word. In other words, the utterance coverage may require that, for each content word that is included in an eligible extractive summary, at least one interaction utterance including the content word be included in the extractive summary. Thus, if an extractive summary includes at least one content word that is selected to be included in the extractive summary but includes no interaction utterances that comprise the selected content word, that extractive summary may not deemed an eligible extractive summary under the utterance coverage constraint. In some embodiments, the utterance coverage constraint is satisfied if the condition described by the equation $\Sigma_{j=1}^{z} \Sigma_{j \in T_j^k} x_i^j \geq y_k$ is satisfied, where j is an iteration variable that iterates over z interaction parties associated with the multi-party interaction transcript, $T_j^k$ is the set of interaction utterances that are both associated with the jth interaction party and in which the kth content word appears, $x_i^j$ an index variable that has the value of one if the ith interaction utterance of the jth interaction party is selected as part of an eligible extractive summary and has the value of zero otherwise, and $y_k$ is an index variable that has the value of one if the kth content word is selected as part of an eligible extractive summary and has the value of zero otherwise.

The term "content word coverage constraint" may refer to a data entity that is configured to describe an optimization constraint for determining an eligible extractive summarization of a multi-party interaction transcript, where the optimization constraint may be configured to require that, if the covered subset for a particular eligible extractive summary comprises a particular interaction utterance having one or more per-utterance content words, then the covered subset for the particular eligible extractive summary should comprise all of the one or more per-utterance content words. In other words, the content coverage constraint may require that, for each interaction utterance that is included in an eligible extractive summary, all content words appearing in the interaction utterance also be included in the eligible extractive summary. Thus, if an extractive summary includes an interaction utterance but does not include all of the content words of the interaction utterance, that extractive summary may not deemed an eligible extractive summary under the content word coverage constraint. In some embodiments, the content word coverage constraint is satisfied if the condition described by the equation $\Sigma_{k \in C_i^j} y_k \geq |C_i^j| \times x_i^j$ satisfied, where $C_i^j$ is the set of content words in the ith interaction utterance of the jth interaction party, k is an iteration variable that iterates over $C_i^j$, $|C_i^j|$ is the cardinality of $C_i^j$, and $x_i^j$ an index variable that has the value of one if the ith interaction utterance of the jth interaction party is selected as part of an eligible extractive summary and has the value of zero otherwise.

The term "party coverage constraint" may refer to a data entity that is configured to describe an optimization constraint for determining an eligible extractive summarization of a multi-party interaction transcript, where the optimization constraint may be configured to require that each covered subset for an eligible extractive summary comprises at least one interaction utterance from each per-party utterance subset of the one or more per-party utterance subsets. In other words, the party coverage constraint may require that at least one interaction utterance of each party to the multi-party interaction transcript is included in an eligible extractive summary. Thus, if an extractive summary has no interaction utterances from one or more interaction parties to the corresponding multi-party interaction transcript, then the extractive summary may be deemed to be ineligible in accordance with the party coverage constraint. In some embodiments, the party coverage constraint is satisfied if the condition described by the equation $\Sigma_{i=1}^{N_j} x_i^j \geq 1$ is satisfied, where i is an iteration variable that iterates over $N_j$ utterances of the jth interaction party and $x_i^j$ is an index variable that has the value of one if the ith interaction utterance of the jth interaction party is selected as part of an eligible extractive summary and has the value of zero otherwise.

The term "party size constraint" may refer to a data entity that is configured to describe an optimization constraint for determining an eligible extractive summarization of a multi-party interaction transcript, where the optimization constraint may be configured to require that each covered subset for an eligible extractive summary comprises a below-threshold count of interaction utterances from each per-party utterance subset of the one or more per-party utterance subsets. In other words, the party size constraint may ensure that no interaction party is over-represented in an eligible extractive summary, where determining whether an interaction party is over-represented may be determined in accordance with whether the number of interaction utterances of the interaction party that appear in the eligible extractive summary exceed a per-party utterance count threshold value. Thus, assuming an exemplary per-party utterance count threshold value of ten, if an extractive summary includes eleven interaction utterances from a particular interaction party, then the extractive summary may be deemed ineligible in accordance with the party size constraint. In some embodiments, the party size constraint may be deemed satisfied if the condition described by the equation $\Sigma_{j=1}^{z} x_i^j \geq L_j$ is satisfied, where j is an iteration variable that iterates over z interaction parties associated with the multi-party interaction transcript, $x_i^j$ is an index variable that has the value of one if the ith interaction utterance of the jth interaction party is selected as part of an eligible extractive summary and has the value of zero otherwise, and $L_j$ is the above-noted per-party utterance count threshold value (number of interaction utterances) for the jth party.

The term "similarity-based constraint" may refer to a data entity that is configured to describe an optimization constraint for determining an eligible extractive summarization of a multi-party interaction transcript, where the optimization constraint may be configured to require that if the covered subset for a particular eligible extractive summary comprises a particular interaction utterance that is in a particular per-party utterance, then the covered subset for the particular eligible extractive summary should further comprise each other interaction utterance that is in any per-party utterance subset other than the particular per-party utterance subset and that has a threshold-satisfying utterance similarity measure with respect to the particular interaction utterance. In other words, the similarity-based constraint may require that, if a first interaction utterance from a first interaction party is included in an eligible extractive summary, then each interaction utterance of any other interaction party whose similarity measure with respect to the first interaction utterance satisfies (e.g., exceeds, exceeds or is equal to, and/or the like) an utterance similarity measure threshold value should also be included in the eligible extractive summary. Thus, if a first interaction utterance that is deemed to have threshold-satisfying similarity with respect to a second interaction utterance is included in an extractive summary, and further if the extractive summary does not include the second interaction utterance, then extractive summary may be deemed ineligible under the similarity-based constraint. In some embodiments, the similarity-based constraint is deemed satisfied if the condition described by the equation $x_p^a + x_q^b \geq 2$ if $sim(s_p^a, s_q^b) \geq 0.4$ is satisfied, where $s_p^a$ is the ath interaction utterance of the pth party, $s_q^b$ is the bth interaction utterance of the qth party, $x_p^a$ is an index variable that has the value of one if $s_p^a$ is selected as part of an eligible extractive summary and has the value of zero otherwise, $x_q^b$ is an index variable that has the value of one if $s_q^b$ is selected as part of an eligible extractive summary and has the value of zero otherwise, $sim(s_p^a, s_q^b)$ is the similarity measure for $s_p^a$ and $s_q^b$, and 0.4 is an example of an utterance similarity measure threshold value.

The term "eligible extractive summary" may refer to a data entity that is configured to describe a defined segment of a multi-party interaction transcript that satisfies one or more required optimization constraints, where a segment of a multi-party interaction transcript may include at least one a subset of interaction utterances of the multi-party interaction transcript and a subset of content words of the multi-party interaction transcript. Examples of required optimization constraints that may be satisfied by eligible extractive summaries include as an utterance coverage constraint, a content word coverage constraint, a party coverage constraint, a party size constraint, and a similarity-based constraint. As described above: (i) the utterance coverage constraint may require that, if the covered subset for a particular eligible extractive summary comprises a particular covered content word, then the covered subset for the particular eligible extractive summary should further comprise at least one interaction utterance of the plurality of interaction utterances that is associated with the particular covered content words; (ii) the content word coverage constraint may require that, if the covered subset for a particular eligible extractive summary comprises a particular interaction utterance having one or more per-utterance content words, then the covered subset for the particular eligible extractive summary should comprise all of the one or more per-utterance content words; (iii) the party coverage constraint may require that each covered subset for an eligible extractive summary comprises at least one interaction utterance from each per-party utterance subset of the one or more per-party utterance subsets; (iv) the party size constraint may require that each covered subset for an eligible extractive summary comprises a below-threshold count of interaction utterances from each per-party utterance subset of the one or more per-party utterance subsets; and (iv) the similarity-based constraint may require that if the covered subset for a particular eligible extractive summary comprises a particular interaction utterance that is in a particular per-party utterance, then the covered subset for the particular eligible extractive summary should further comprise each other interaction utterance that is in any per-party utterance subset other than the particular per-party utterance subset and that has a threshold-satisfying utterance similarity measure with respect to the particular interaction utterance.

The term "overall summary utility measure" may refer to a data entity that is configured to describe an estimated measure of usefulness of the extractive summary that is determined based at least in part on each information quality measure for an interaction utterance of the plurality of interaction utterances that is in the covered subset for the eligible extractive summary and each linguistic quality measure for an interaction utterance of the plurality of interaction utterances that is in the covered subset for the eligible extractive summary. In some embodiments, the overall summary utility measure may be determined based at least in part on the output of the equation $\Sigma_{j=1}^{z} \Sigma_{i=1}^{N_j} IQ(s_i^j) \cdot x_i^j + \Sigma_{k=1}^{M} score(k) \cdot y_k$, where j is an iteration variable that iterates over z interaction parties associated with the multi-party interaction transcript, i is an iteration variable that iterates over $N_j$ utterances of the jth interaction party, $s_i^j$ is the ith interaction utterance of the jth interaction party, $IQ(s_i^j)$ is the information quality measure of $s_i^j$, $LQ(s_i^j)$ is the linguistic quality measure of $s_i^j$, $x_i^j$ is an index variable that has the value of one if $s_i^j$ is selected as part of an eligible extractive summary and has the value of zero otherwise, k is an iteration variable that iterates over M content words, score(k) is the weight of the kth content word, and $y_k$ is an index variable that has the value of one if the kth content word is selected as part of an eligible extractive summary and has the value of zero otherwise.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about summarization of a natural language document, such as summarization of a transcript (e.g., summarization of a multi-party interaction transcript, such as a two-party call transcript).

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

FIG. 4 is a flowchart diagram of an example process 400 for generating an optimal extractive summary of a multi-party interaction transcript. Via the various steps/operations of the process 400, the predictive data analysis computing entity 106 can generate extractive summaries in an efficient and reliable manner by utilizing an unsupervised machine learning model that utilizes predictive inferences grounded in relationships of interaction utterances across interaction parties to generate reliable and representative extractive summaries for multi-party interactions.

The process 400 begins at step/operation 401 when the predictive data analysis computing entity 106 identifies the multi-party interaction transcript. The multi-party interaction transcript may describe a temporal flow of verbal interactions between two or more interaction parties. An example of a multi-party interaction transcript is a call transcript between two or more parties to the call, such as a call transcript for a call between a customer service agent and a customer. In the noted example, the call transcript may describe verbal interactions by the parties in a temporally sequential manner, where each verbal interaction by a party may include one or more utterances (e.g., on or more sentences). For example, with respect to the call transcript for a call between a customer service agent and a customer, the call transcript may describe that a first set of utterances by the customer service agent (e.g., "Hello, how is your day today and how can I help you?") is temporally followed by a second set of utterances by the customer (e.g., "Thank you, doing well, I am trying to check my account balance."), which may then be temporally followed by a third set of utterances by the customer service agent, and so on. Other examples of multi-party interaction transcripts include meeting transcripts, conference call transcripts, auction transcripts, and/or the like.

Accordingly, a multi-party interaction transcript is associated with two or more interaction parties, where each interaction party describes a verbal participant in the multi-party interaction that is associated with the multi-party interaction transcript. While various embodiments of the present invention are described with reference to two-party interaction transcripts and/or with reference to call transcripts, a person of ordinary skill in the relevant technology will recognize that the disclosed techniques may be utilize to generate optimal extractive summaries of interaction transcripts associated with any number of interaction parties as well as to generate optimal extractive summaries of interaction transcripts associated with any type of multi-party interaction events, such as to generate optimal extractive summaries of meeting transcripts, conference call transcripts, auction transcripts, and/or the like.

A multi-party interaction transcript is associated with one or more interaction utterances. An interaction utterance may be any semantically coherent unit of words that is recorded by the multi-party interaction transcript. An example of an interaction utterance is a sentence. In some embodiments, to detect interaction utterances in a multi-party interaction transcript, the predictive data analysis computing entity 106 utilizes one or more speech fragmentation algorithms, such as one or more sentence detection algorithms. Each interaction utterance in a multi-party interaction transcript is typically associated with an interaction party of the plurality of interaction parties that are in turn associated with the multi-party interaction transcript. Accordingly, in some embodiments, the interaction utterances in a multi-party interaction transcript may be divided into two or more subsets, where each subset includes the set of interaction utterances in a multi-party interaction transcript that is associated with a particular interaction party of the two or more interaction parties. The described subsets are referred to herein as per-party utterance subsets. For example, with respect to the call transcript for a call between a customer service agent and a customer, the call transcript may be associated with two per-party utterance subsets: a first per-party utterance subsets that describes all of the interaction utterances associated with the customer service agent and a second per-party utterance subset that describes all of the interaction utterances associated with the customer.

An operational example of a multi-party interaction transcript 500 is depicted in FIG. 5. As depicted in FIG. 5, the multi-party interaction transcript 500 is associated with a group of interaction utterances each followed by a numeric designator of zero or one, where the group of interaction utterances are listed in a temporally sequential order. As further depicted in FIG. 5, the multi-party interaction transcript 500 is associated with two interaction parties: a first interaction party associated with the numeric designator of zero and a second interaction party associated with the numeric designator of one. Accordingly, in the operational example of FIG. 500, the per-party utterance subsets for the multi-party interaction transcript 500 include: a first per-party utterance subset that includes each interaction utterance that is followed by the numeric designator of zero, and a second per-party utterance subset that includes each utterance that is followed by the numeric designator of one.

Returning to FIG. 4, at step/operation 402, the predictive data analysis computing entity 106 updates the multi-party interaction transcript by performing preprocessing on the multi-party interaction transcript. Examples of preprocessing operations that may be performed as part of step/operation 402 may include stop word removal, non-relevant word filtering, named entity recognition (NER), and part of speech (PoS) tagging. One objective of the preprocessing operations performed at step/operation 402 may be to remove semantic inference complications resulting from presence of stop words and/or non-relevant words. Another objective of the preprocessing operations performed at step/operation 402 may be to highlight/record semantic relationships across words and/or other semantic units of the natural language data captured by the multi-party interaction transcript. In some embodiments, the former objective noted above is accomplished at least in part by performing stop word removal and non-relevant word filtering, while the latter objective noted above is accomplished at least in part by performing NER and PoS.

At step/operation 403, the predictive data analysis computing entity 106 detects per-party utterance subsets in the multi-party interaction subset. As described above, a per-party utterance subset is a subset of interaction utterances in a multi-party interaction transcript that includes all of the interaction utterances that are associated with a particular interaction party of the two or more interaction parties that are associated with the particular multi-party interaction transcript. Accordingly, in some embodiments, the interaction utterances in a multi-party interaction transcript may be divided into two or more subsets, where each subset includes the set of interaction utterances in a multi-party interaction transcript that is associated with a particular interaction party of the two or more interaction parties. The described subsets are referred to herein as per-party utterance subsets. For example, with respect to the call transcript for a call between a customer service agent and a customer, the call transcript may be associated with two per-party utterance subsets: a first per-party utterance subsets that describes all of the interaction utterances associated with the customer service agent and a second per-party utterance subset that describes all of the interaction utterances associated with the customer.

At step/operation 404, the predictive data analysis computing entity 106 processes the multi-party interaction transcript in accordance with the detected per-party utterance subsets in order to generate the optimal extractive summary. The optimal extractive summary for a multi-party interaction transcript describes one or more segments of the multi-party interaction transcript that are deemed to optimally represent the contents of the multi-party interaction transcript. For example, the optimal extractive summary for a multi-party interaction transcript may include a covered subset of the interaction utterances associated with the multi-party interaction transcript that are deemed to optimally represent the contents of the multi-party interaction transcript. As another example, the optimal extractive summary for a multi-party interaction transcript may include one or more content words associated with the multi-party interaction transcript that are deemed to optimally represent the contents of the multi-party interaction transcript. As yet another example, the optimal extractive summary for a multi-party interaction transcript may include one or more word collections (e.g., one or more word collections) associated with the multi-party interaction transcript that are deemed to optimally represent the contents of the multi-party interaction transcript.

In some embodiments, step/operation 404 may be performed in accordance with the process depicted in FIG. 6. The process depicted in FIG. 6 begins at step/operation 601 when the predictive data analysis computing entity 106 detects content words in the multi-party interaction transcript. A content word may be a word that is deemed to likely have a substantial amount of information about the contents of at least one portion of a multi-party interaction transcript that includes the content word. Content words of a multi-party interaction transcript may be determined by using one or more semantically significant word detection techniques. For example, in accordance with one technique, words having particular grammatical/semantic roles (e.g., as inferred by PoS) may be deemed to be content words. Accordingly, in some embodiments, at least one of nouns, verbs, and adjectives (e.g., all three of nouns, verbs, and adjectives) may be deemed to be content words. As another example, in accordance with another technique, words that match entries in a dictionary of semantically significant words may be deemed to be content words. In some embodiments, the predictive data analysis computing entity 106 assigns a weight to each content word using a word ranking algorithm, such as a core rank algorithm.

At step/operation 602, the predictive data analysis computing entity 106 determines an information quality measure and a linguistic quality measure for each interaction utterance in the multi-party interaction transcript. Example techniques for determining information quality measures and/or linguistic quality measures for interaction utterances are described below. However, a person of ordinary skill in the relevant technology will recognize that other techniques may be utilized to compute at least one of information quality measures and linguistic quality measures. In some embodiments, step/operation 602 can be performed concurrently with step/operation 601.

An information quality measure may describe an estimated measure of the degree of information contained in the words of a corresponding interaction utterance. For example, the information quality measure for a particular sentence may describe the likelihood that the sentence contains significant information based at least in part on the words used in the sentence. In some embodiments, the information quality measure for an interaction utterance is determined by combining (e.g., aggregating) each per-word information quality measure for a word used in the interaction utterance. In some embodiments, the per-word information quality measure for a word in an interaction utterance is determined based at least in part on the equation $$S(V_i) = (1-d) + d \times \sum_{V_j \in adj(V_i)} \frac{w_{ij}}{\sum_{V_k \in adj(V_j)} w_{jk}} S(V_i) \quad \text{(Equation 1)}$$

where $V_i$ represents the word, $S(V_i)$ represents the per-word information quality measure for the word, $adj(V_i)$ represents the neighboring words of $V_i$ as determined based at least in part on a graph representation of the semantic relationship of the words of the interaction utterance, and d is a damping factor (e.g., 0.85). Exemplary techniques for determining information quality measures for interaction utterances are described in Banerjee et al., *Multi-Document Abstractive Summarization Using ILP based Multi-Sentence Compression*, arXiv:1609.07034v1, available online at https://arxiv.org/pdf/1609.07034.pdf (2016).

A linguistic quality measure may describe an estimated measure of the likelihood that an utterance represents a linguistically viable collection of words. In some embodiments, the linguistic quality measure is determined based at least in part on a language model, such as a trigram language model that assigns probabilities to sequences of words. For example, given an interaction utterance $p_i^{c^j}$ that includes a sequence of words $\{w_1, w_2, \ldots, w_q\}$, the linguistic quality score for the interaction utterance (denoted as $LQ(p_i^{c^j})$) may be determined using the equation $$LQ(p_i^{c^j}) = \frac{1}{1 - LL(w_1, w_2, \ldots, w_q)},$$

where $LL(w_1, w_2, \ldots, w_q)$ is a probability aggregation measure for the interaction utterance $p_i^{c^j}$ that can be computed using the equation $$LL(w_1, w_2, \ldots, w_q) = \frac{1}{L} \log_2 \prod_{t=2}^{q} (w_t \mid w_{t-1}, w_{t-2}),$$

where L is the length of the interaction utterance $p_i^{c^j}$. Exemplary techniques for determining linguistic quality measures for interaction utterances are described in Banerjee et al., *Multi-Document Abstractive Summarization Using ILP based Multi-Sentence Compression*, arXiv:1609.07034v1, available online at https://arxiv.org/pdf/1609.07034.pdf (2016).

At step/operation 603, the predictive data analysis computing entity 106 performs an ILP analysis based at least in part on each information quality measure for an interaction utterance and each linguistic quality measure for an interaction utterance to generate the optimal extractive summary. In some embodiments, the ILP operation is defined based an overall summary utility measure as well as a group of optimization constraints defined below. In some embodiments, to perform the ILP operation, the predictive data analysis computing entity 106 first generates a plurality of eligible extractive summaries, where each eligible extractive summary of the plurality of eligible comprises a covered subset of the plurality of interaction utterances that complies with one or more required optimization constraints. Afterward, the predictive data analysis computing entity 106 generates an overall summary utility measure for each eligible extractive summary based at least in part on each information quality measure for an interaction utterance of the plurality of interaction utterances that is in the covered subset for the eligible extractive summary and each linguistic quality measure for an interaction utterance of the plurality of interaction utterances that is in the covered subset for the eligible extractive summary. Thereafter, the predictive data analysis computing entity 106 generates the optimal extractive based at least in part on each overall summary utility measure for an eligible extractive summary of the plurality of eligible extractive summaries. In some embodiments, step/operation 603 can be performed concurrently with step/operations 601-602.

In some embodiments, the ILP operation described above may be performed in accordance with the maximization problem $\max(\Sigma_{j=1}^{z} \Sigma_{i=1}^{N_j} IQ(s_i^j) LQ \quad (s_i^j) \cdot x_i^j + \Sigma_{k=1}^{M} \text{score}(k) \cdot y_k)$ where j is an iteration variable that iterates over z interaction parties associated with the multi-party interaction transcript, i is an iteration variable that iterates over $N_j$ utterances of the jth interaction party, $s_i^j$ is the ith interaction utterance of the jth interaction party, $IQ(s_i^j)$ is the information quality measure of $s_i^j$, $LQ(s_i^j)$ is the linguistic quality measure of $s_i^j$, $x_i^j$ is an index variable that has the value of one if $s_i^j$ is selected as part of an eligible extractive summary and has the value of zero otherwise, k is an iteration variable that iterates over M content words, score(k) is the weight of the kth content word, and $y_k$ is an index variable that has the value of one if the kth content word is selected as part of an eligible extractive summary and has the value of zero otherwise. In some embodiments, the noted optimization problem may be characterized by (i.e., may be framed as subject to) a group of required optimization constraints, such as at least one of (e.g., all of) an utterance coverage constraint, a content word coverage constraint, a party coverage constraint, a party size constraint, and a similarity-based constraint.

The utterance coverage constraint may require that, if the covered subset for a particular eligible extractive summary comprises a particular covered content word, then the covered subset for the particular eligible extractive summary should further comprise at least one interaction utterance of the plurality of interaction utterances that is associated with the particular covered content word. In other words, the utterance coverage may require that, for each content word that is included in an eligible extractive summary, at least one interaction utterance including the content word be included in the extractive summary. Thus, if an extractive summary includes at least one content word that is selected to be included in the extractive summary but includes no interaction utterances that comprise the selected content word, that extractive summary may not deemed an eligible extractive summary under the utterance coverage constraint. In some embodiments, the utterance coverage constraint is satisfied if the condition described by the equation $\Sigma_{j=1}^{z} \Sigma_{j \in T_j^k} x_i^j \geq y_k$ is satisfied, where j is an iteration variable that iterates over z interaction parties associated with the multi-party interaction transcript, $T_j^k$ is the set of interaction utterances that are both associated with the jth interaction party and in which the kth content word appears, $x_i^j$ is an index variable that has the value of one if the ith interaction utterance of the jth interaction party is selected as part of an eligible extractive summary and has the value of zero otherwise, and $y_k$ is an index variable that has the value of one if the kth content word is selected as part of an eligible extractive summary and has the value of zero otherwise.

The content word coverage constraint may require that, if the covered subset for a particular eligible extractive summary comprises a particular interaction utterance having one or more per-utterance content words, then the covered subset for the particular eligible extractive summary should comprise all of the one or more per-utterance content words. In other words, the content coverage constraint may require that, for each interaction utterance that is included in an eligible extractive summary, all content words appearing in the interaction utterance also be included in the eligible extractive summary. Thus, if an extractive summary includes an interaction utterance but does not include all of the content words of the interaction utterance, that extractive summary may not deemed an eligible extractive summary under the content word coverage constraint. In some embodiments, the content word coverage constraint is satisfied if the condition described by the equation $\Sigma_{k \in C_i^j} y_k \geq |C_i^j| \times x_i^j$ is satisfied, where $C_i^j$ is the set of content words in the ith interaction utterance that contain the jth content word, k is an iteration variable that iterates over $C_i^j$, $|C_i^j|$ is the cardinality of $C_i^j$, and $x_i^j$ an index variable that has the value of one if the ith interaction utterance of the jth interaction party is selected as part of an eligible extractive summary and has the value of zero otherwise.

The party coverage constraint may require that each covered subset for an eligible extractive summary comprises at least one interaction utterance from each per-party utterance subset of the one or more per-party utterance subsets. In other words, the party coverage constraint may require that at least one interaction utterance of each party to the multi-party interaction transcript is included in an eligible extractive summary. Thus, if an extractive summary has no interaction utterances from one or more interaction parties to the corresponding multi-party interaction transcript, then the extractive summary may be deemed to be ineligible in accordance with the party coverage constraint. In some embodiments, the party coverage constraint is satisfied if the condition described by the equation $\Sigma_{i=1}^{N_j} x_i^j \geq 1$ is satisfied, where i is an iteration variable that iterates over $N_j$ utterances of the jth interaction party and $x_i^j$ is an index variable that has the value of one if the ith interaction utterance of the jth interaction party is selected as part of an eligible extractive summary and has the value of zero otherwise.

The party size constraint may require that each covered subset for an eligible extractive summary comprises a below-threshold count of interaction utterances from each per-party utterance subset of the one or more per-party utterance subsets. In other words, the party size constraint may ensure that no interaction party is over-represented in an eligible extractive summary, where determining whether an interaction party is over-represented may be determined in accordance with whether the number of interaction utterances of the interaction party that appear in the eligible extractive summary exceed a per-party utterance count threshold value. Thus, assuming an exemplary per-party utterance count threshold value of ten, if an extractive summary includes eleven interaction utterances from a particular interaction party, then the extractive summary may be deemed ineligible in accordance with the party size constraint. In some embodiments, the party size constraint may be deemed satisfied if the condition described by the equation $\Sigma_{j=1}^{z} x_i^j \geq L_j$ is satisfied, where j is an iteration variable that iterates over z interaction parties associated with the multi-party interaction transcript, $x_i^j$ is an index variable that has the value of one if the ith interaction utterance of the jth interaction party is selected as part of an eligible extractive summary and has the value of zero otherwise, and $L_j$ is the per-party utterance count threshold value for the jth party.

The similarity-based constraint may require that if the covered subset for a particular eligible extractive summary comprises a particular interaction utterance that is in a particular per-party utterance, then the covered subset for the particular eligible extractive summary should further comprise each other interaction utterance that is in any per-party utterance subset other than the particular per-party utterance subset and that has a threshold-satisfying utterance similarity measure with respect to the particular interaction utterance. In other words, the similarity-based constraint may require that, if a first interaction utterance from a first interaction party is included in an eligible extractive summary, then each interaction utterance of any other interaction party whose similarity measure with respect to the first interaction utterance satisfies (e.g., exceeds, exceeds or is equal to, and/or the like) an utterance similarity measure threshold value should also be included in the eligible extractive summary. Thus, if a first interaction utterance that is deemed to have threshold-satisfying similarity with respect to a second interaction utterance is included in an extractive summary, and further if the extractive summary does not include the second interaction utterance, then extractive summary may be deemed ineligible under the similarity-based constraint. In some embodiments, the similarity-based constraint is deemed satisfied if the condition described by the equation $x_p^a + x_q^b \geq 2$ if $sim(s_p^a, s_q^b) \geq 0.4$ is satisfied, where $s_p^a$ is the ath interaction utterance of the pth party, $s_q^b$ is the bth interaction utterance of the qth party, $x_p^a$ is an index variable that has the value of one if $s_p^a$ is selected as part of an eligible extractive summary and has the value of zero otherwise, $x_q^b$ is an index variable that has the value of one if $s_b^q$ is selected as part of an eligible extractive summary and has the value of zero otherwise, $sim(s_p^a, s_q^b)$ is the similarity measure for $s_p^a$ and $s_q^b$, and 0.4 is an example of an utterance similarity measure threshold value.

In some embodiments, performing the ILP operation includes performing the following constrained optimization problem, which can be interpreted in light of the below-provided Table 1:

---

$\max(\Sigma_{(j=1)}^2 \Sigma_{(i=1)}^{N_j} IQ(s_i^j) \, LQ(s_i^j) \cdot x_i^j + \Sigma_{(k=1)}^M \text{Score}(k), y_k)$
subject to
1) $\Sigma_{(j=1)}^2 \Sigma_{(j \in T_{kj})} x_i^j \geq y_k$ (if the content word k is selected to be included in the summary, then at least one utterance in which this content word is present, is to be selected (in each party utterance summary))
2) $\Sigma_{(k \in C_j^i)} y_k \geq |C_j^i| \times x_i^j$, j = 1, 2 (if a particular utterance is selected to be included in the summary, then all the content words in that utterance are also included in the summary (in each party utterance summary))
3) )
4) $\Sigma_{(i-1)}^{N_j} x_i^j \geq 1$, j = 1, 2 (Each party summary is non non-empty)
5) $\Sigma_{(i=1)} x_i^j \leq L_j$ j = 1, 2 (Each party utterance summary cannot exceed a certain length)
6) $x_p^1 + x_q^2 \geq 2$, if $sim(s_p^1, s_q^2) \geq 0.4$, for all p = 1, . . . , $N_1$, q = 1, . . . , $N_2$ (a pair of sentences from each party dialogue is selected if similarity of the pair exceeds a threshold)
$x_i^j \in \{0, 1\}$, j = 1, 2
$y_k \in \{0, 1\}$, k = 1, 2, . . . , M

---

TABLE 1

| Notations | Meaning |
|---|---|
| M | Total no of content words |
| $sim(s_p^1, s_q^2)$ | Similarity of sentence $s_p^1$ and sentence $s_q^2$ |
| $N_j$ | No of sentences considered in the utterance group for the jth party |

TABLE 1-continued

| Notations | Meaning |
|---|---|
| $s_i^j$ | ith sentence in the j-th party |
| $IQ(s_i^j)$ | The informativeness of ith sentence unit in j-th party |
| $LQ(s_i^j)$ | The linguistic quality of ith sentence unit in j-th party |
| Score(k) | The CoreRank score of kth content word. |
| $x_i^j$ | Indicator variable for the i-th sentence for the j-th party |
| $y_k$ | Indicator variable for the kth content word. |
| $C_i^j$ | Set of content words in ith sentence in j-th party dialogues |
| $S_k$ | Set of sentences containing the content word k. |
| $T_k^j$ | set of sentences in the j-th party where content word k is present |
| $Imp(s_i^j)$ | The importance of ith sentence unit in j-th party |

In some embodiments, step/operation 603 may be performed in accordance with the process depicted in FIG. 7. The process that is depicted in FIG. 7 begins at step/operation 701 when the predictive data analysis computing entity 106 generates eligible extractive summaries. An eligible extractive summary describes a segment of a multi-party interaction transcript that satisfies one or more required optimization constraints, where a segment of a multi-party interaction transcript may include at least one a subset of interaction utterances of the multi-party interaction transcript and a subset of content words of the multi-party interaction transcript. Examples of required optimization constraints that may be satisfied by eligible extractive summaries include as an utterance coverage constraint, a content word coverage constraint, a party coverage constraint, a party size constraint, and a similarity-based constraint. As described above: (i) the utterance coverage constraint may require that, if the covered subset for a particular eligible extractive summary comprises a particular covered content word, then the covered subset for the particular eligible extractive summary should further comprise at least one interaction utterance of the plurality of interaction utterances that is associated with the particular covered content word; (ii) the content word coverage constraint may require that, if the covered subset for a particular eligible extractive summary comprises a particular interaction utterance having one or more per-utterance content words, then the covered subset for the particular eligible extractive summary should comprise all of the one or more per-utterance content words; (iii) the party coverage constraint may require that each covered subset for an eligible extractive summary comprises at least one interaction utterance from each per-party utterance subset of the one or more per-party utterance subsets; (iv) the party size constraint may require that each covered subset for an eligible extractive summary comprises a below-threshold count of interaction utterances from each per-party utterance subset of the one or more per-party utterance subsets; and (iv) the similarity-based constraint may require that if the covered subset for a particular eligible extractive summary comprises a particular interaction utterance that is in a particular per-party utterance, then the covered subset for the particular eligible extractive summary should further comprise each other interaction utterance that is in any per-party utterance subset other than the particular per-party utterance subset and that has a threshold-satisfying utterance similarity measure with respect to the particular interaction utterance.

At step/operation 702, the predictive data analysis computing entity 106 determines an overall summary utility measure for each eligible extractive summary. The overall summary utility measure for an extractive summary may be a measure of usefulness of the extractive summary that is determined based at least in part on each information quality measure for an interaction utterance of the plurality of interaction utterances that is in the covered subset for the eligible extractive summary and each linguistic quality measure for an interaction utterance of the plurality of interaction utterances that is in the covered subset for the eligible extractive summary. As described above, the overall summary utility measure may be determined based at least in part on the output of the equation $\Sigma_{j=1}^{z}\Sigma_{i=1}^{N_j} IQ(s_i^j) \cdot x_i^j + \Sigma_{k=1}^{M} score(k) \cdot y_k$, where j is an iteration variable that iterates over z interaction parties associated with the multi-party interaction transcript, i is an iteration variable that iterates over $N_j$ utterances of the jth interaction party, $s_i^j$ is the ith interaction utterance of the jth interaction party, $IQ(s_i^j)$ is the information quality measure of $s_i^j$, $LQ(s_i^j)$ is the linguistic quality measure of $s_i^j$, $x_i^j$ is an index variable that has the value of one if $s_i^j$ is selected as part of an eligible extractive summary and has the value of zero otherwise, k is an iteration variable that iterates over M content words, score (k) is the weight of the kth content word, and $y_k$ is an index variable that has the value of one if the kth content word is selected as part of an eligible extractive summary and has the value of zero otherwise.

At step/operation 703, the predictive data analysis computing entity 106 generates the optimal extractive summary based at least in part on each overall summary utility measure for an eligible extractive summary. In some embodiments, the predictive data analysis computing entity 106 selects the eligible extractive summary that has the highest optimal extractive summary as the optimal extractive summary. In some embodiments, the optimal extractive summary includes at least one of one or more selected interaction utterances, one or more selected content words, and one or more selected constructed phrases that are constructed based at least in part on the one or more selected content words.

In some embodiments, subsequent to generating the optimal extractive summary, the predictive data analysis computing entity 106 generates per-party optimal summaries by dividing the interaction utterances in the optimal extractive summary into two segments based at least in part on associations of the interaction utterances. For example, if an optimal extractive summary includes five interaction utterances from party A and six interaction utterances from party B, then the updated optimal extractive summary may include a first per-party optimal summary that describes the five interaction utterances associated with the party A and a second per-party optimal summary that describes the six interaction utterances associated with the party B.

Returning to FIG. 4, at step/operation 405, the predictive data analysis computing entity 106 updates the optimal extractive summary by performing one or more post-processing operations. In some embodiments, subsequent to generating the optimal extractive summary, the predictive data analysis computing entity 106 ranks the interaction utterances in the optimal extractive summary based at least in part on per-utterance weights determined for each interaction utterance in the optimal extractive summary, where the per-utterance weight for a particular interaction utterance in the optimal extractive summary may be determined based at least in part on at least one of (e.g., based at least in part on a combination/product of) the information quality measure for the particular interaction utterance and the linguistic quality measure for the particular interaction utterance.

In some embodiments, subsequent to generating the optimal extractive summary, the predictive data analysis computing entity 106 generates per-party optimal summaries by dividing the interaction utterances in the optimal extractive summary into two segments based at least in part on associations of the interaction utterances. For example, if an optimal extractive summary includes five interaction utterances from party A and six interaction utterances from party B, then the updated optimal extractive summary may include a first per-party optimal summary that describes the five interaction utterances associated with the party A and a second per-party optimal summary that describes the six interaction utterances associated with the party B. In some embodiments, subsequent to generating a per-party optimal summary, the predictive data analysis computing entity 106 ranks the interaction utterances in the per-party optimal summary based at least in part on per-utterance weights determined for each interaction utterance in the per-party optimal summary, where the per-utterance weight for a particular interaction utterance in the per-party optimal summary may be determined based at least in part on at least one of (e.g., based at least in part on a combination/product of) the information quality measure for the particular interaction utterance and the linguistic quality measure for the particular interaction utterance.

At step/operation 406, the predictive data analysis computing entity 106 performs one or more summary-based actions based at least in part on the optimal extractive summary. For example, the predictive data analysis computing entity 106 may display the optimal extractive summary using a summary display user interface, such as the summary display user interface 800 of FIG. 8. As depicted in FIG. 8, the summary display user interface 800 displays the per-party optimal summary 801 for a first interaction party, the per-party optimal summary 802 for a second interaction party, the top content words 803 of the corresponding multi-party interaction transcript, and the constructed/inferred phrase 804 of the corresponding multi-party interaction transcript.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   determining, by one or more processors, one or more per-party utterance subsets from multi-party interaction transcript data, wherein: (1) the multi-party interaction transcript data comprises a plurality of interaction utterances associated with a plurality of interaction parties, and (2) each of the one or more per-party utterance subsets comprises one or more of the plurality of interaction utterances that are associated with one of the plurality of interaction parties;
   generating, by the one or more processors and using an unsupervised machine learning model, an optimal extractive summary, wherein the optimal extractive summary comprises one of a plurality of eligible extractive summaries that is selected based at least in part on respective overall summary utility measures for each of the plurality of eligible extractive summaries, wherein:

(i) each of the plurality of eligible extractive summaries comprises a covered subset of the plurality of interaction utterances that complies with one or more optimization constraints, and the one or more optimization constraints comprise a similarity-based optimization constraint based at least in part on a covered subset for a particular one of the plurality of eligible extractive summaries comprising (a) a particular one of the plurality of interaction utterances that is in a particular one of the one or more per-party utterance subsets, and (b) additional ones of the plurality of interaction utterances, each of which is in any per-party utterance subset of the one or more per-party utterance subsets other than the particular one of the one or more per-party utterance subsets having a threshold-satisfying utterance similarity measure with respect to the particular one of the plurality of interaction utterances, and (ii) each of the respective overall summary utility measures is based at least in part on an information quality measure and a linguistic quality measure for each of the plurality of interaction utterances in the covered subset for the particular one of the plurality of eligible extractive summaries; and initiating, by the one or more processors, the performance of one or more summary-based actions based at least in part on the optimal extractive summary.

2. The computer-implemented method of claim 1, wherein the one or more optimization constraints further comprise a content word coverage constraint requiring that, in an instance in which the covered subset for the particular one of the plurality of eligible extractive summaries comprises a particular interaction utterance having one or more per-utterance content words, then the covered subset for the particular one of plurality of eligible extractive summaries comprises all of the one or more per-utterance content words.

3. The computer-implemented method of claim 1, wherein the one or more optimization constraints further comprise an utterance coverage constraint requiring that, in an instance in which the covered subset for the particular one of the purality of eligible extractive summaries comprises a particular covered content word, the covered subset for the particular one of the plurality of eligible extractive summaries further comprises at least one interaction utterance of the plurality of interaction utterances that is associated with the particular covered content word.

4. The computer-implemented method of claim 1, wherein the one or more optimization constraints further comprise a party coverage constraint requiring that each covered subset for an eligible extractive summary comprises at least one interaction utterance from each of the one or more per-party utterance subsets.

5. The computer-implemented method of claim 1, wherein the one or more optimization constraints further comprise a party size constraint requiring that each covered subset for an eligible extractive summary comprises a below-threshold count of interaction utterances from each of the one or more per-party utterance subsets.

6. The computer-implemented method of claim 1 further comprising: generating each information quality measure by:
   generating a graph representation of one or more per-utterance content words that are associated with each of the plurality of interaction utterances in the covered subset for the particular one of the plurality of eligible extractive summaries;

for each per-utterance content word of one or more per-utterance content words that is associated with each of the plurality of interaction utterances in the covered subset for the particular one of the plurality of eligible extractive summaries:
    generating a neighboring subset of the one or more per-utterance content words based at least in part on the graph representation, and
    generating a per-word the information quality measure based at least in part on each per-utterance content word of the one or more per-utterance content words that is in the neighboring subset of the per-utterance content word; and
generating the information quality measure based at least in part on each per-word information quality measure for a per-utterance content word of the one or more per-utterance content words that is associated with each of the plurality of interaction utterances in the covered subset for the particular one of the plurality of eligible extractive summaries.

7. The computer-implemented method of claim 1 further comprising generating the linguistic quality measure by generating a probability aggregation measure based at least in part on a per-sequence probability for each n-gram word sequence of a set of n-gram word sequences that are associated with each of the plurality of interaction utterances in the covered subset for the particular one of the plurality of eligible extractive summaries.

8. The computer-implemented method of claim 7, where the set of n-gram word sequences comprises a set of trigram word sequences.

9. An apparatus comprising one or more processors and memory including program code, the memory and the program code configured to, with the one or more processors, cause the apparatus to at least:
    determine one or more per-party utterance subsets from multi-party interaction transcript data, wherein: (1) the multi-party interaction transcript data comprises a plurality of interaction utterances associated with a plurality of interaction parties, and (2) each of the one or more per-party utterance subsets comprises one or more of the plurality of interaction utterances that are associated with one of the plurality of interaction parties;
    generate, using an unsupervised machine learning model, an optimal extractive summary, wherein the optimal extractive summary comprises one of a plurality of eligible extractive summaries that is selected based at least in part on respective overall summary utility measures for each of the plurality of eligible extractive summaries, wherein:
        (i) each of the plurality of eligible extractive summaries comprises a covered subset of the plurality of interaction utterances that complies with one or more optimization constraints, and the one or more optimization constraints comprise a similarity-based optimization constraint based at least in part on a covered subset for a particular one of the plurality of eligible extractive summaries comprising (a) a particular one of the plurality of interaction utterances that is in a particular one of the one or more per-party utterance subsets, and (b) additional ones of the plurality of interaction utterances, each of which is in any per-party utterance subset of the one or more per-party utterance subsets other than the particular one of the one or more per-party utterance subsets having a threshold-satisfying utterance similarity measure with respect to the particular one of the plurality of interaction utterances, and
        (ii) each of the respective overall summary utility measures is based at least in part on an information quality measure and a linguistic quality measure for each of the plurality of interaction utterances in the covered subset for the particular one of the plurality of eligible extractive summaries; and
    initiate the performance of one or more summary-based actions based at least in part on the optimal extractive summary.

10. The apparatus of claim 9, wherein the one or more optimization constraints further comprise a content word coverage constraint requiring that, in an instance in which the covered subset for the particular one of the plurality of eligible extractive summaries comprises a particular interaction utterance having one or more per-utterance content words, then the covered subset for the particular one of the plurality of eligible extractive summaries comprises all of the one or more per-utterance content words.

11. The apparatus of claim 9, wherein the one or more optimization constraints further comprise an utterance coverage constraint requiring that, in an instance in which the covered subset for the particular one of the plurality of eligible extractive summaries comprises a particular covered content word, the covered subset for the particular one of the plurality of eligible extractive summaries further comprises at least one interaction utterance of the plurality of interaction utterances that is associated with the particular covered content word.

12. The apparatus of claim 9, wherein the one or more optimization constraints further comprise a party coverage constraint requiring that each covered subset for an eligible extractive summary comprises at least one interaction utterance from each of the one or more per-party utterance subsets.

13. The apparatus of claim 9, wherein the one or more optimization constraints further comprise a party size constraint requiring that each covered subset for an eligible extractive summary comprises a below-threshold count of interaction utterances from each of the one or more per-party utterance subsets.

14. The apparatus of claim 9 further caused to generate the information quality measure by:
    generating a graph representation of one or more per-utterance content words that are associated with each of the plurality of interaction utterances in the covered subset for the particular one of the plurality of eligible extractive summaries;
    for each per-utterance content word of one or more per-utterance content words that is associated with each of the plurality of interaction utterances in the covered subset for the particular one of the plurality of eligible extractive summaries:
        generating a neighboring subset of the one or more per-utterance content words based at least in part on the graph representation, and
        generating a per-word the information quality measure based at least in part on each per-utterance content word of the one or more per-utterance content words that is in the neighboring subset of the per-utterance content word; and
generating the information quality measure based at least in part on each per-word information quality measure for a per-utterance content word of the one or more per-utterance content words that is associated with each of the plurality of interaction utterances in the covered subset for the particular one of the plurality of eligible extractive summaries.

15. The apparatus of claim 9 further caused to generate the linguistic quality measure by generating a probability aggregation measure based at least in part on a per-sequence probability for each n-gram word sequence of a set of n-gram word sequences that are associated with each of the plurality of interaction utterances in the covered subset for the particular one of the plurality of eligible extractive summaries.

16. The apparatus of claim 15, where the set of n-gram word sequences comprises a set of trigram word sequences.

17. A computer program product comprising at least one non-transitory computer-readable storage medium having computer-readable program code portions stored therein, the computer-readable program code portions configured to:
  determine one or more per-party utterance subsets from multi-party interaction transcript data, wherein: (1) the multi-party interaction transcript data comprises a plurality of interaction utterances associated with a plurality of interaction parties, and (2) each of the one or more per-party utterance subsets comprises one or more of the plurality of interaction utterances that are associated with one of the plurality of interaction parties;
  generate, using an unsupervised machine learning model, an optimal extractive summary, wherein the optimal extractive summary comprises one of a plurality of eligible extractive summaries that is selected based at least in part on respective overall summary utility measures for each of the plurality of eligible extractive summaries, wherein:
    (i) each of the plurality of eligible extractive summaries comprises a covered subset of the plurality of interaction utterances that complies with one or more optimization constraints, and the one or more optimization constraints comprise a similarity-based optimization constraint based at least in part on a covered subset for a particular one of the p lurality of eligible extractive summaries comprising (a) a particular one of the plurality of interaction utterances that is in a particular one of the one or more per-party utterance subsets, and (b) additional ones of the plurality of interaction utterances, each of which is in any per-party utterance subset of the one or more per-party utterance subsets other than the particular one of the one or more per-party utterance subsets having a threshold-satisfying utterance similarity measure with respect to the particular one of the plurality of interaction utterances, and
    (ii) each of the respective overall summary utility measures is based at least in part on an information quality measure and a linguistic quality measure for each of the plurality of interaction utterances in the covered subset for the particular one of the plurality of eligible extractive summaries; and
  initiate the performance of one or more summary-based actions based at least in part on the optimal extractive summary.

18. The computer program product of claim 17, wherein the one or more optimization constraints further comprise a content word coverage constraint requiring that, in an instance in which the covered subset for the particular one of the plurality of eligible extractive summaries comprises a particular interaction utterance having one or more per-utterance content words, then the covered subset for the particular one of the plurality of eligible extractive summaries comprises all of the one or more per-utterance content words.

* * * * *

UNITED STATES PATENT AND TRADEMARK OFFICE
CERTIFICATE OF CORRECTION

| | |
|---|---|
| PATENT NO. | : 11,727,935 B2 |
| APPLICATION NO. | : 17/122607 |
| DATED | : August 15, 2023 |
| INVENTOR(S) | : Vijay Varma Malladi et al. |

It is certified that error appears in the above-identified patent and that said Letters Patent is hereby corrected as shown below:

In the Claims

In Column 28, Line 35, Claim 2, delete "of plurality" and insert -- of the plurality --, therefor.

In Column 28, Line 42, Claim 3, delete "purality" and insert -- plurality --, therefor.

In Column 32, Line 4, Claim 17, delete "p lurality" and insert -- plurality --, therefor.

Signed and Sealed this
Seventh Day of November, 2023

Katherine Kelly Vidal
*Director of the United States Patent and Trademark Office*